(12) United States Patent
Dohi

(10) Patent No.: US 11,767,913 B2
(45) Date of Patent: Sep. 26, 2023

(54) ROTATION LOCKING DEVICE

(71) Applicant: NSK LTD., Tokyo (JP)

(72) Inventor: Nagao Dohi, Fujisawa (JP)

(73) Assignee: NSK, LTD., Tokyo (JP)

( * ) Notice: Subject to any disclaimer, the term of this patent is extended or adjusted under 35 U.S.C. 154(b) by 0 days.

(21) Appl. No.: 17/633,257

(22) PCT Filed: Mar. 17, 2021

(86) PCT No.: PCT/JP2021/010780
§ 371 (c)(1),
(2) Date: Feb. 7, 2022

(87) PCT Pub. No.: WO2021/187515
PCT Pub. Date: Sep. 23, 2021

(65) Prior Publication Data
US 2023/0003299 A1    Jan. 5, 2023

(30) Foreign Application Priority Data

Mar. 18, 2020   (JP) ................................ 2020-047896

(51) Int. Cl.
*F16H 63/34*    (2006.01)
*B60T 1/00*    (2006.01)
*B60T 1/06*    (2006.01)
*F16D 43/21*    (2006.01)
(Continued)

(52) U.S. Cl.
CPC .......... *F16H 63/3433* (2013.01); *B60T 1/005* (2013.01); *B60T 1/062* (2013.01);
(Continued)

(58) Field of Classification Search
CPC ............. F16H 63/3416; F16H 63/3425; F16H 63/3433; F16H 63/3466; F16H 35/00;
(Continued)

(56) References Cited

U.S. PATENT DOCUMENTS

| 2004/0011605 A1* | 1/2004 | Tachiiri ................. B60T 13/746 188/156 |
| 2021/0262532 A1* | 8/2021 | Toyoda ................. F16D 41/105 |
| 2021/0265232 A1  | 8/2021 | Sakai |

FOREIGN PATENT DOCUMENTS

| JP | 2002310295 A | * 10/2002 | ..... F16H 2061/2884 |
| JP | 2008307996 A | * 12/2008 | |

(Continued)

OTHER PUBLICATIONS

International Search Report (US/JP), for International Application No. PCT/JP2021/010780, dated Apr. 20, 2021, (11 pages).
(Continued)

*Primary Examiner* — Richard M Lorence
(74) *Attorney, Agent, or Firm* — Hartman Global IP Law; Gary M. Hartman; Domenica N. S. Hartman

(57) ABSTRACT

A rotation locking device 4 has a locking gear 5; a reverse input blocking clutch having an input member 12 and an output member 13; and an engaging member 8, and switches between a first mode where an engaging claw portion 14 engages with an engaging concave portion 9 by the output member 13 rotating the engaging member 8 due to the input member 12 being rotationally driven, and rotation of the locking gear 5 is restricted, and a second mode where engagement between the engaging claw portion 14 and the engaging concave portion 9 is released and rotation of the locking gear 5 is allowed.

10 Claims, 32 Drawing Sheets

(51) Int. Cl.
  *F16D 63/00* (2006.01)
  *F16H 35/00* (2006.01)
  *F16D 43/22* (2006.01)

(52) U.S. Cl.
  CPC ............ *F16D 43/211* (2013.01); *F16D 43/22* (2013.01); *F16D 63/006* (2013.01); *F16H 35/00* (2013.01); *F16H 63/3425* (2013.01); *F16H 63/3466* (2013.01); *F16H 2035/005* (2013.01)

(58) Field of Classification Search
  CPC .... F16H 2035/005; B60T 1/005; B60T 1/052; F16D 3/50; F16D 43/02; F16D 43/211; F16D 43/22; F16D 59/00; F16D 63/006
  See application file for complete search history.

(56) References Cited

FOREIGN PATENT DOCUMENTS

| JP | 2010006299 A | * | 1/2010 | ......... F16H 63/3466 |
| JP | 2019138410 A | * | 8/2019 | ............ F16D 41/10 |
| JP | 2019190561 A | * | 10/2019 | |
| WO | 2019026794 A1 | | 2/2019 | |

OTHER PUBLICATIONS

Supplemental European Search Report for International Application No. 21772061.4, dated Sep. 13, 2022 (4 pages).

* cited by examiner

ROTATION LOCKING DEVICE

CROSS REFERENCE TO RELATED APPLICATIONS

This application claims the benefit of PCT/JP2021/010780 filed Mar. 17, 2021, having a priority claim to Japanese Patent Application No. 2020-047896 filed Mar. 18, 2020. The contents of these prior patent documents are incorporated herein by reference.

TECHNICAL FIELD

The present invention relates to a rotation locking device for disabling rotation of a rotating member of a power transmission apparatus, and particularly relates to a rotation locking device in an automobile equipped with an automatic transmission and used in a parking locking mechanism or the like that locks rotation of an output shaft of the automatic transmission when a shift lever is shifted to select a parking (P) range.

BACKGROUND ART

An automobile equipped with an automatic transmission includes a parking locking mechanism that locks rotation of the output shaft by engaging a claw-shaped parking locking pole with a parking locking gear provided on the output shaft of the automatic transmission in a case where the shift lever is shifted to select the P range. FIG. 32 illustrates a parking locking mechanism as described in JP 2010-006299A.

The parking locking mechanism 100 includes an actuator 101, a shaft 102 rotationally driven by the actuator 101, a detent plate 103 that pivots with the rotation of the shaft 102, a rod 104 that moves linearly with the pivoting of the detent plate 103, a parking locking gear 105 fixed to the output shaft of the automatic transmission, a parking locking pole 106 supported so as to be able to pivot around a pivot shaft parallel to the output shaft, and a detent spring 107 for limiting the pivoting of the detent plate 103 and for maintaining the shift position. The rod 104 has a cone-shaped cam 108 at the tip-end portion.

When the shift lever is shifted to select the P range, the actuator 101 causes the shaft 102 to rotate. When the shaft 102 rotates, the detent plate 103 pivots in a direction indicated by arrow α in FIG. 32, and the rod 104 displaces in a direction indicated by the arrow β in FIG. 32. Then, a roller 110 provided at the tip-end portion of the detent spring 107 engages with a parking locking groove 109 provided in the detent plate 103, the large diameter side portion of the cam 108 pushes up the parking locking pole 106, and a claw portion 111 of the parking locking pole 106 and an engaging concave portion 112 of the parking locking gear 105 engage. This locks or limits the rotation of the output shaft of the automatic transmission.

CITATION LIST

Patent Literature

Patent Literature 1: JP 2010-006299A

SUMMARY OF THE INVENTION

Technical Problem

The parking locking mechanism 100 described in JP 2010-006299A pivots the detent plate 103 based on the rotation of the shaft 102 by the actuator 101, and further, by causing the rod 104 to displace with the pivoting of the detent plate 103, the cam 108 provided on the tip-end portion of the rod 104 pushes the parking locking pole 106 up and causes the claw portion 111 to engage with an engaging concave portion 112. The structure of such a parking locking mechanism 100 is complicated, the assembly work is troublesome, and the cost tends to increase.

Moreover, in a case where the service brake is released in a state in which the parking locking mechanism 100 is operated and the parking brake is not activated when parking an automobile on an inclined road surface, the drive wheels try to rotate, and together with this the parking locking gear 105 also tries to rotate. As a result, the side surface in the circumferential direction of an engaging concave portion 112 of the parking locking gear 105 is strongly pressed against the side surface of the claw portion 111 of the parking locking pole 106. In a case of releasing the parking locking mechanism 100 from this state, it is necessary to cause the parking locking pole 106 to pivot downward while sliding the side surface of the claw portion 111 with respect to the side surface in the circumferential direction of the engaging concave portion 112. In other words, a large force is required to release the parking locking mechanism 100. Therefore, in the parking locking mechanism 100, it is necessary to use a large actuator having a large output as the actuator 101, which is disadvantageous in terms of miniaturization thereof.

In consideration of the circumstances described above, an object of the present invention is to achieve construction of a rotation locking device that can be easily configured, and that is capable of keeping the force required for releasing small as necessary.

Solution to Problem

The rotation locking device according to an aspect of the present invention includes a locking gear, a reverse input blocking clutch, and an engaging member.

The locking gear has engaging concave portions at a plurality of locations in the circumferential direction.

The reverse input blocking clutch has an input member and an output member arranged coaxially with each other, and in a case where rotational torque is inputted to the input member, transmits the rotational torque inputted to the input member to the output member, and in a case where rotational torque is reversely inputted to the output member, does not transmit the rotational torque inputted to the output member to the input member.

The engaging member has an engaging claw portion capable of engaging with an engaging concave portion of the engaging concave portions, and is rotatably supported by the output member.

In particular, the rotation locking device according to an aspect of the present invention is able to switch between a first mode where the engaging claw portion engages with the engaging concave portion by the output member rotating the engaging member due to the input member being rotationally driven, and rotation of the locking gear is restricted, and a second mode where engagement between the engaging claw portion and the engaging concave portion is released and rotation of the locking gear is allowed.

The rotation locking device according to one aspect of the present application may also include an actuator for rotationally driving the input member.

The rotation locking device according to an aspect of the present invention, by rotating the engaging member in the same direction as a direction of force applied to the engaging member from the locking gear when switching from the first mode to the second mode, is able to release engagement between the engaging claw portion and the engaging concave portion.

The reverse input blocking clutch may include:

the input member having an input member side engaging portion;

the output member having an output member side engaging portion;

a pressed member having a pressed surface; and an engaging element having a pressing surface that faces the pressed surface, an engaging element side input engaging portion that engages with the input member side engaging portion, and an engaging element side output engaging portion that engages with the output member side engaging portion.

The engaging element, when rotational torque is inputted to the input member, displaces so as to separate the pressing surface from the pressed surface due to engagement between the input member side engaging portion and the engaging element side input engaging portion, and by engaging the engaging element side output engaging portion with the output member side engaging portion, transmits the rotational torque inputted to the input member to the output member; and, when rotational torque is reversely inputted to the output member, displaces so as to press the pressing surface against the pressed surface due to engagement between the output member side engaging portion and the engaging element side output engaging portion, and by frictionally engaging the pressing surface with the pressed surface, does not transmit the rotational torque reversely inputted to the output member to the input member.

The rotation locking device according to an aspect of the present invention may include a pair of engaging elements, each composed of the engaging element. In this case, the pair of engaging elements is arranged so as to sandwich the output member side engaging portion from outside in the radial direction. Note that the number of the input member side engaging portions of the input member corresponds to the number of engaging elements.

In this case, the engaging element may include:

an engaging element main body having the pressing surface, the engaging element side output engaging portion, and a pivot support portion located on a side closer to the pressed surface than the engaging element side input engaging portion in a direction of movement of the pressing surface when moving away from or toward the pressed surface; and a link member having the engaging element side input engaging portion, and a pivotally supported portion that is pivotally supported by the pivot support portion.

The engaging element main body may include:

a pair of main body plates, each having a plate side output engaging portion constituting the engaging element side output engaging portion, and arranged overlapping in the axial direction of the pressed surface and coupled to each other; and a pivot support shaft constituting the pivot support portion, both side portions in the axial direction of the pivot support shaft being supported by the pair of main body plates.

The link member may be arranged between the pair of main body plates.

The engaging element main body may include at least one intermediate plate that is sandwiched between the pair of main body plates.

The rotation locking device according to an aspect of the present invention may include a speed reducer between the output member and the engaging member.

The rotation locking device according to an aspect of the present invention may be assembled and used in a drive system that transmits rotational torque from a drive source to drive wheels. In other words, the rotation locking device according to an aspect of the present invention may form a parking locking mechanism that locks rotation of drive wheels in a case where a shift lever is shifted to select a P range.

Effect of Invention

The rotation locking device according to an aspect of the present invention may be easily configured and is capable of keeping cost down.

Furthermore, by including a function that releases engagement between the engaging claw portion and the engaging concave portion by rotating the engaging member in the same direction as the force applied from the locking gear to the engaging member when switching from the first mode to the second mode, the force required for releasing engagement (switching from the first mode to the second mode) can be suppressed to a small value.

BRIEF DESCRIPTION OF THE DRAWINGS

FIG. 20A (b) is a view illustrating a state after rotational torque has been inputted to the input member from the state illustrated in FIG. 20A (a). FIG. 20B (b) is a view illustrating a state after rotational torque has been inputted to the input member from the state illustrated in FIG. 20B (a).

DESCRIPTION OF EMBODIMENTS

First Example

Figure 1:
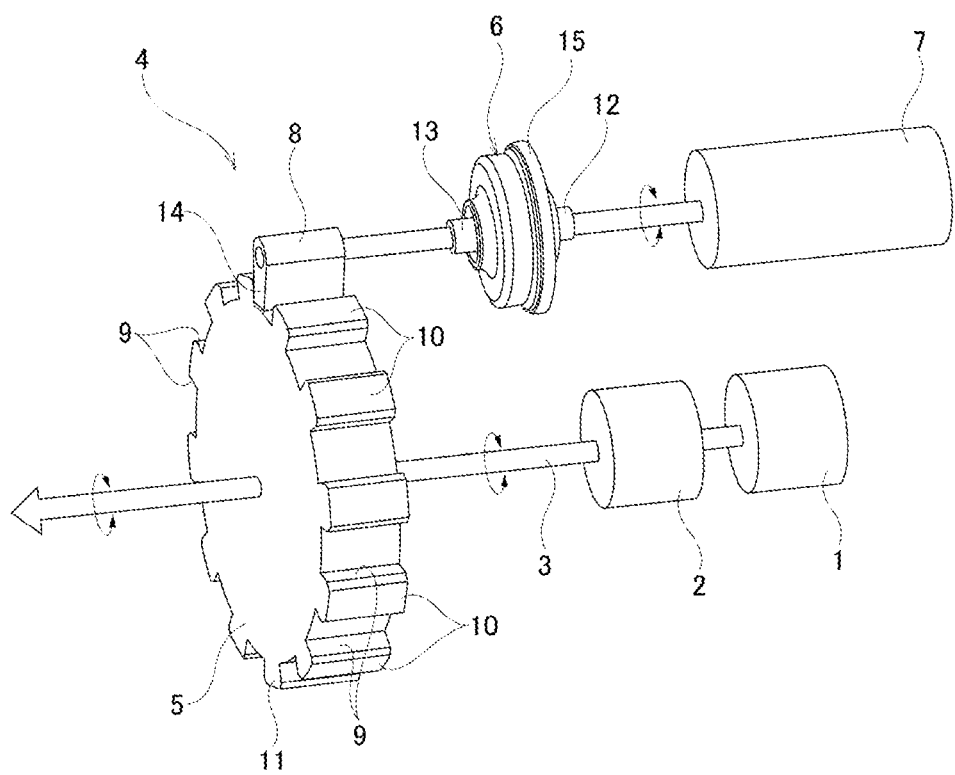
FIG. 1 is a schematic perspective view of a parking locking mechanism to which a rotation locking device according to a first example of an embodiment of the present invention is applied.
Figure 2:
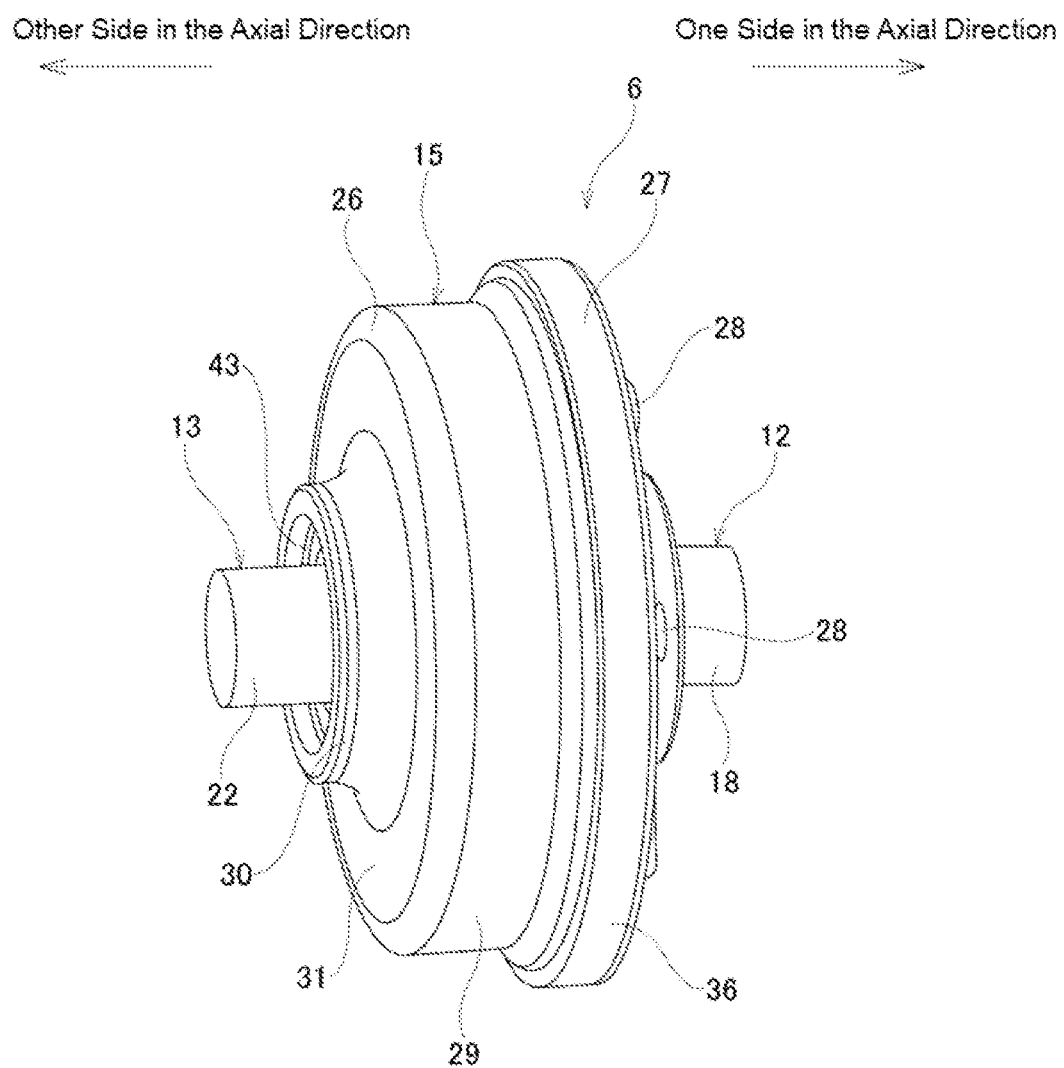
FIG. 2 is a perspective view of a reverse input blocking clutch of the rotation locking device of the first example.
Figure 3:
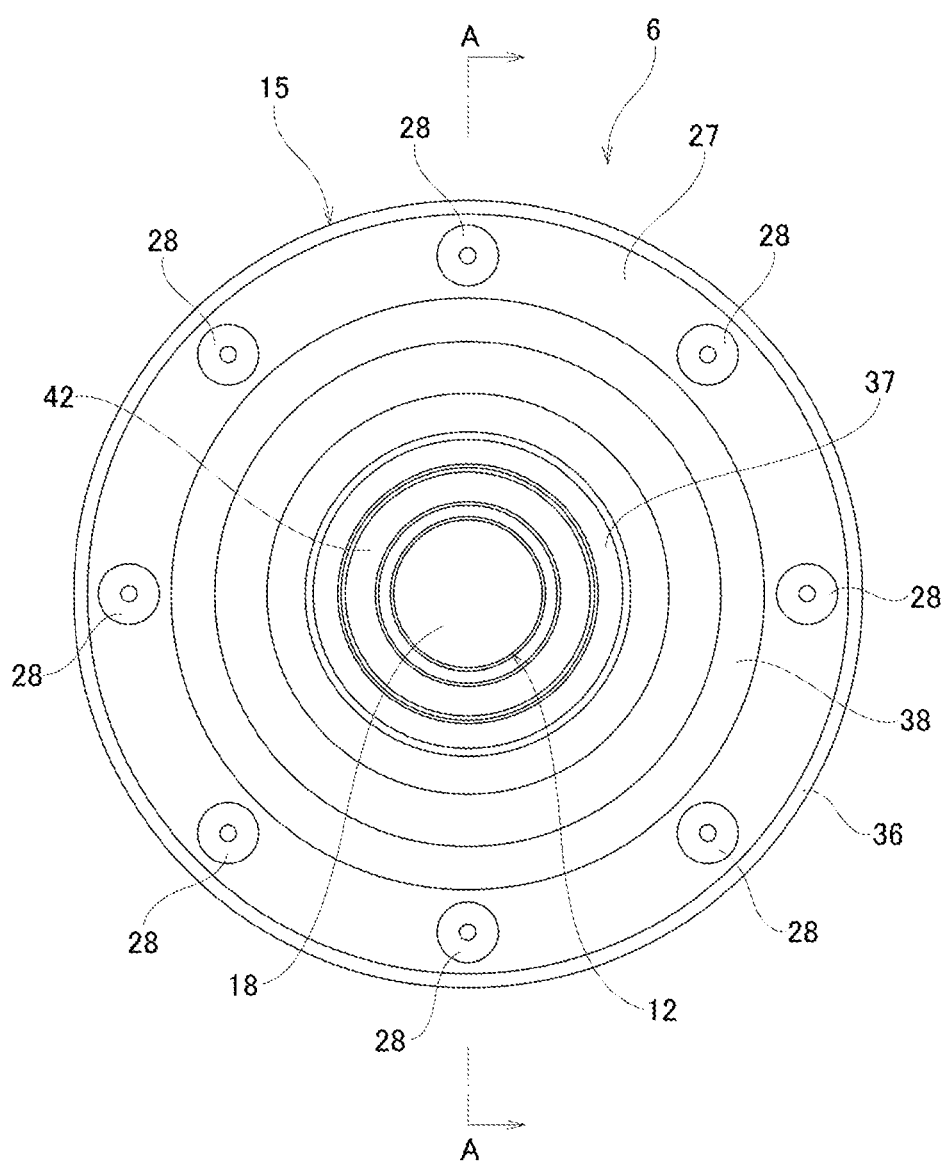
FIG. 3 is an end view of the reverse input blocking clutch of the first example as viewed from the right side in FIG. 2.

A first example of an embodiment of the present invention will be described with reference to FIGS. 1 to 24. This example is an example in which the rotation locking device of the present invention is applied to a parking locking mechanism. As illustrated in FIG. 1, in an automobile, the rotation of a drive source 1 is decelerated by an automatic transmission 2 (the output torque of the drive source 1 is increased by the automatic transmission 2), and is transmitted to drive wheels (not illustrated) via a differential gear or the like.

The drive source 1 includes an engine and/or an electric motor.

The automatic transmission 2 includes a parallel shaft gear type or a planetary gear type stepped transmission or the like, or a belt type, a chain type, a toroidal type continuously variable transmission or the like.

An automobile equipped with the automatic transmission 2 includes a parking locking mechanism in which a rotation locking device 4 that locks the rotation of the output shaft 3 of the automatic transmission 2 when a shift lever is shifted to select a P range is applied.

Overall Structure of Rotation Locking Device

The rotation locking device 4 of the parking locking mechanism of this example includes a locking gear 5, a reverse input blocking clutch 6, an actuator 7, and an engaging member 8. Hereinafter, the overall structure of the rotation locking device 4, the structure of the reverse input blocking clutch 6, and the operation of the rotation locking device 4 will be described in that order.

The locking gear 5 has engaging concave portions 9 at a plurality of locations on the outer peripheral surface and at equal intervals in the circumferential direction. In other words, the locking gear 5 has a gear portion 11 formed by alternately arranging engaging concave portions 9 and convex portions 10 on the outer peripheral surface. The locking gear 5 is externally fitted and fixed to the output shaft 3 of the automatic transmission 2 so that relative rotation is not possible.

The reverse input blocking clutch 6 has an input member 12 and an output member 13 arranged coaxially with each other. In this example, the input member 12 and the output member 13 are arranged in parallel with the output shaft 3 of the automatic transmission 2. The reverse input blocking clutch 6, in a case where rotational torque is inputted to the input member 12, transmits the rotational torque that is inputted to the input member 12 to the output member 13 regardless of the rotation direction of the input member 12, and in a case where rotational torque is reversely inputted to the output member 13, completely blocks the rotational torque that is reversely inputted to the output member 13 and does not transmit the rotational torque to the input member 12 regardless of the rotation direction of the output member 13.

The actuator 7 rotationally drives the input member 12 of the reverse input blocking clutch 6 in both the forward rotation direction and the reverse rotation direction. The actuator 7 includes an electric motor or the like.

The engaging member 8 has an engaging claw portion 14 that is able to engage with one of the engaging concave portions 9 of the locking gear 5 (can be arranged inside the engaging concave portions 9), and is supported so as to be able to be rotatably driven by the output member 13 of the reverse input blocking clutch 6. In this example, the base-end portion of the engaging member 8 is supported by and fixed to the tip-end portion (end portion on the left side in FIG. 1) of the output member 13. Moreover, the engaging member 8 has an end surface shape of which a width dimension (thickness) decreases as going toward the tip-end portion from the base-end portion as viewed in the axial direction of the output member 13 (toward the lower side in FIG. 22A and FIG. 23A), and has an engaging claw portion 14 on the tip-end portion.

Reverse Input Blocking Clutch

The reverse input blocking clutch 6 of the rotation locking device 4 of this example includes an input member 12, an output member 13, a housing 15 constituting a pressed member, a pair of engaging elements 16, and a pair of springs 17. Note that in the description of the reverse input blocking clutch 6 of this example, the axial direction, the radial direction, and the circumferential direction, unless specified otherwise, mean the axial direction, the radial direction, and the circumferential direction of the reverse input blocking clutch 6. Moreover, the axial direction, the radial direction, and the circumferential direction of the reverse input blocking clutch 6 coincide with the axial direction, the radial direction, and the circumferential direction of the input member 12, and coincide with the axial direction, the radial direction, and the circumferential direction of the output member 13. Regarding the reverse input blocking clutch 6, one side in the axial direction refers to the right side in FIGS. 2, 4, 5, 10, 13, 14, and 16 to 19, and the other side in the axial direction refers to the left side in FIGS. 2, 4, 5, 10, 13, 14, and 16 to 19.

Figure 4:
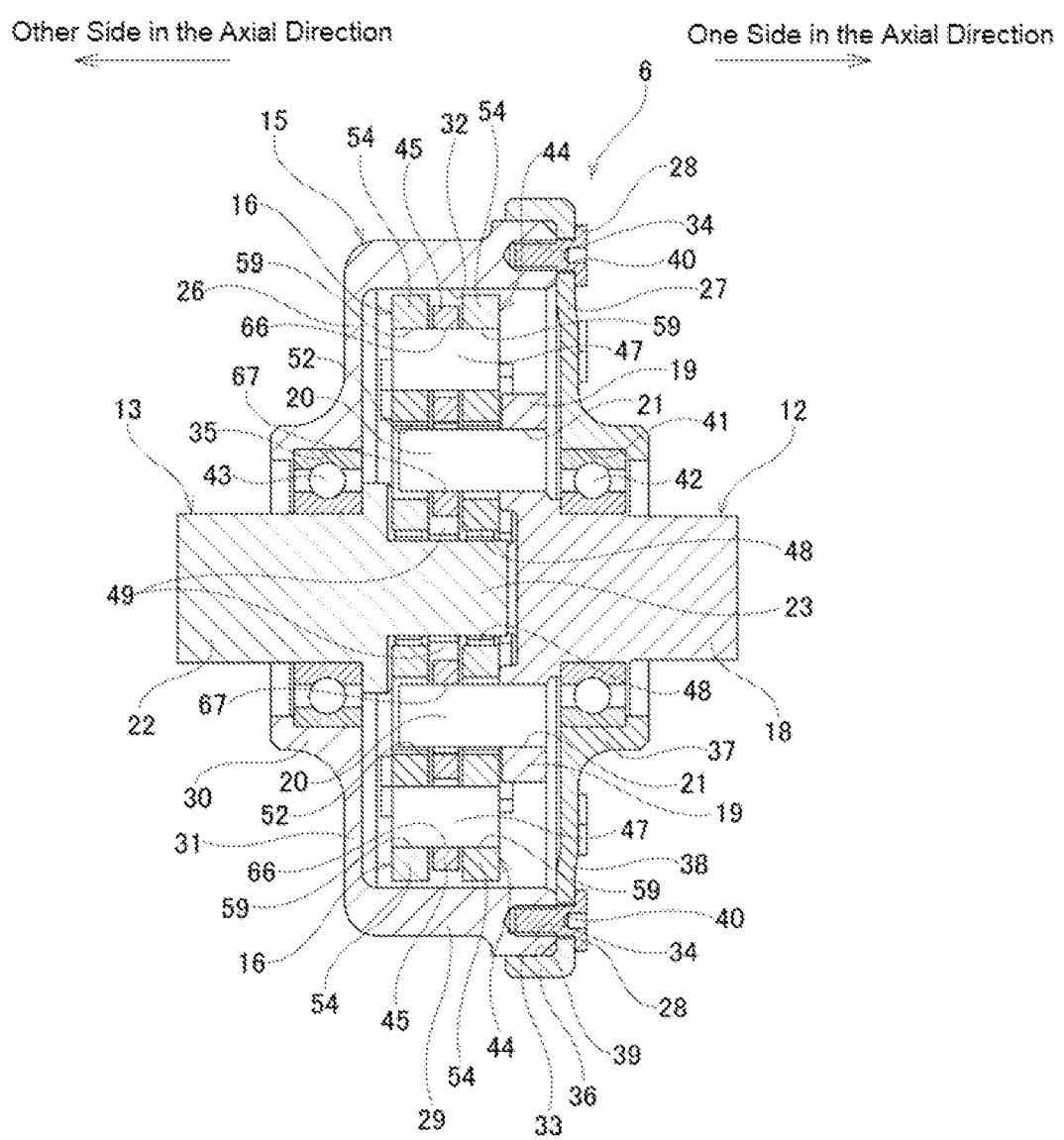
FIG. 4 is a cross-sectional view taken along section line A-A in FIG. 3 of the reverse input blocking clutch of the first example.
Figure 5:
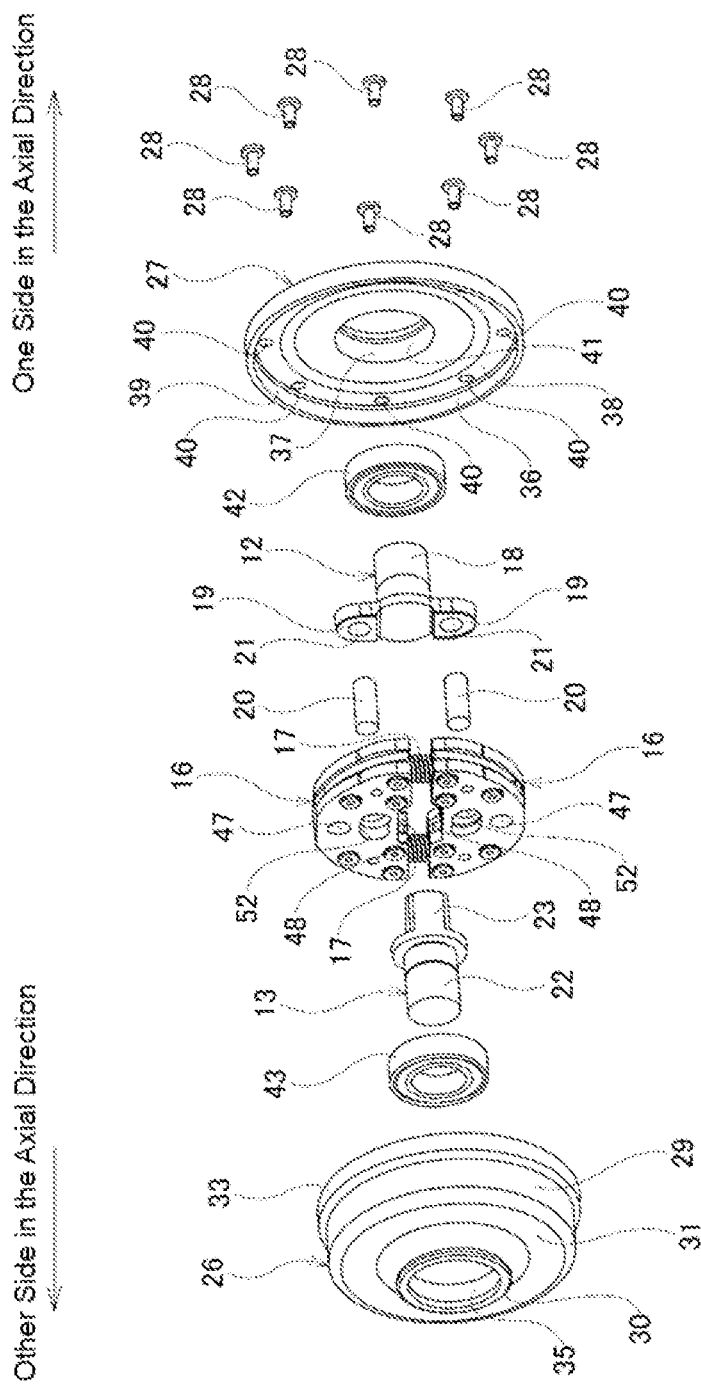
FIG. 5 is an exploded perspective view of the reverse input blocking clutch of the first example.

The input member 12 is rotationally driven by the actuator 7. In other words, rotational torque is inputted to the input member 12 from the actuator 7. As illustrated in FIGS. 4 and 5, the input member 12 has an input shaft portion 18, a pair of input arm portions 19, and a pair of input member side engaging portions 20. The input shaft portion 18 is configured in a columnar shape, and the output shaft of the actuator 7 is connected to an end portion on one side in the axial direction thereof. The pair of input arm portions 19 extend from the end portion on the other side in the axial direction of the input shaft portion 18 toward opposite sides in the radial direction from each other. Each input arm portion 19 has a support hole 21 which is a through hole in the axial direction in an intermediate portion in the radial direction thereof. Each of the input member side engaging portions 20 of the pair of input member side engaging portions 20 is configured by a columnar pin. The end portion on the one side in the axial direction of each input member side engaging portion 20 is internally fitted in and fixed to the support hole 21 of each input arm portion 19 by press fitting. Each input member side engaging portion 20 extends to the one side in the axial direction from each input arm portion 19. The input member can be integrally configured as a whole (as one component).

The output member 13 supports and fixes the engaging member 8. The output member 13 is arranged coaxially with the input member 12, and has an output shaft portion 22 and an output member side engaging portion 23 as illustrated in FIGS. 4 and 5. The output shaft portion 22 is formed in a columnar shape, and the engaging member 8 is supported by and fixed to the end portion on the other side in the axial direction thereof. The output member side engaging portion 23 is formed in a substantially oblong columnar shape, and extends from a central portion of the end surface on the one side in the axial direction of the output shaft portion 22 to the one side in the axial direction. The outer peripheral surface of the output member side engaging portion 23, as illustrated in FIGS. 6, 7, 21A and 21B, has side surfaces 24 on both sides in the minor axis direction (vertical direction in FIGS. 6, 7, 21A and 21B), and guide surfaces 25 formed by side surfaces on both sides in the major axis direction (left-right direction in FIGS. 6, 7, 21A and 21B).

Each side surface 24 is composed of a flat surface orthogonal to the minor axis direction of the output member side engaging portion 23. Each guide surface 25 is composed of a convex curved surface. More specifically, each guide surface 25 is composed of a partially cylindrical convex surface centered on the center axis of the output member side engaging portion 23b (center axis of the output member 13). Therefore, regarding the output member 13, for example, the outer peripheral surface of a round bar material can be used as each guide surface 25, and the processing cost can be suppressed accordingly. However, each guide surface may be composed of a partially cylindrical convex surface centered on a shaft parallel to and non-coaxial with the center axis of the output member 13, or may be composed of a non-cylindrical convex surface such as a partially elliptical tubular convex surface. Moreover, in this example, the output shaft portion 22 and the output member side engaging portion 23 are integrally formed; however, the output member may be configured by joining and fixing together the output shaft portion and the output side engaging portion that are separately formed from each other. The output member side engaging portion 23 is arranged further on the inner side in the radial direction than the pair of input member side engaging portions 20, and more specifically, arranged in a portion between the pair of input member side engaging portions 20.

As illustrated in FIGS. 2 to 5, the housing 15 has a hollow disk shape, is fixed to another member (not illustrated), and the rotation of the housing 15 is restricted. The housing 15 is arranged coaxially with the input member 12 and the output member 13, and the pair of input member side engaging portions 20, the output member side engaging portion 23, the pair of engaging elements 16, the pair of springs 17 and the like are housed on the inner side of the housing 15. The housing 15 is configured by joining together an output side housing element (main housing) 26 arranged on the other side in the axial direction and an input side housing element (housing lid) 27 arranged on the one side in the axial direction with a plurality of bolts 28.

The output side housing element 26 includes an outer diameter side cylinder portion 29, an inner diameter side cylinder portion 30, and a side plate portion 31. The outer diameter side cylinder portion 29 is formed in a cylindrical shape. The inner diameter side cylinder portion 30 is formed in a cylindrical shape, and is arranged coaxially with the outer diameter side cylinder portion 29 on the other side in the axial direction of the outer diameter side cylinder portion 29. The side plate portion 31 is formed in a substantially circular flat plate shape, the end portion on the outer side in the radial direction thereof is connected to the end portion on the other side in the axial direction of the outer diameter side cylinder portion 29, and the end portion on the inner side in the radial direction is connected to the end portion on the one side in the axial direction of the inner diameter side cylinder portion 30.

The outer diameter side cylinder portion 29 has a pressed surface 32 on the inner peripheral surface. The pressed surface 32 is configured by a cylindrical surface centered on the center axis of the output side housing element 26. The outer diameter side cylinder portion 29 has an output side in-row fitting surface 33 on the outer peripheral surface of the end portion on the one side in the axial direction, and has a larger outer diameter dimension than the outer peripheral surface of the portion adjacent to the other side in the axial direction. The output side in-row fitting surface 33 is configured by a cylindrical surface centered on the center axis of the output side housing element 26. The outer diameter side cylinder portion 29 has screw holes 34 opened on the side surface on the one side in the axial direction at a plurality of locations (8 locations in the illustrated example) at equal intervals in the circumferential direction of the end portion of the one side in the axial direction. The inner diameter side cylinder portion 30 has an output side bearing fitting surface 35 at a portion from the end portion on the one side to the intermediate portion in the axial direction of the inner peripheral surface. The output side bearing fitting surface 35 is configured by a cylindrical surface centered on the center axis of the output side housing element 26. In other words, the pressed surface 32, the output side in-row fitting surface 33, and the output side bearing fitting surface 35 are arranged coaxially with each other.

The input side housing element 27 includes an outer diameter side cylinder portion 36, an inner diameter side cylinder portion 37, and a side plate portion 38. The outer diameter side cylinder portion 36 is formed in a cylindrical shape. The inner diameter side cylinder portion 37 is formed in a cylindrical shape, and is arranged coaxially with the outer diameter side cylinder portion 36 on the one side in the axial direction of the outer diameter side cylinder portion 36. The side plate portion 38 is formed in a substantially circular flat plate shape, the end portion on the outer side in the radial direction thereof is connected to the end portion on the one side in the axial direction of the outer diameter side cylinder portion 36, and the end portion on the inner side in the radial direction is connected to the end portion on the other side in the axial direction of the inner diameter side cylinder portion 37.

The outer diameter side cylinder portion 36 has an input side in-row fitting surface 39 on the inner peripheral surface. The input side in-row fitting surface 39 is configured by a cylindrical surface centered on the center axis of the input side housing element 27. The input side in-row fitting surface 39 has an inner diameter dimension capable of fitting with the output side in-row fitting surface 33 of the output-side housing element 26 without looseness. The side plate portion 38 has through holes 40 at a plurality of locations that are aligned with the screw holes 34 of the output side housing element 26 and that are at equal intervals in the circumferential direction of the end portion on the outer side in the radial direction. The inner diameter side cylinder portion 37 has an input side bearing fitting surface 41 at a portion from the end portion on the other side to the intermediate portion in the axial direction of the inner peripheral surface. The input side bearing fitting surface 41 is configured by a cylindrical surface centered on the center axis of the input side housing element 27. In other words, the input side in-row fitting surface 39 and the input side bearing fitting surface 41 are arranged coaxially with each other.

The housing 15 is assembled by connecting and fixing together the output side housing element 26 and the input side housing element 27 by fitting the input side in-row fitting surface 39 of the input side housing element 27 with the output side in-row fitting surface 33 of the output-side housing element 26 so there is no looseness, and by inserting bolts 28 into the respective through holes 40 of the input side housing element 27 and screwing the bolts 28 into the corresponding screw holes 34 of the output side housing element 26 and further tightening. In this example, the output side in-row fitting surface 33 and the output side bearing fitting surface 35 of the output side housing element 26 are arranged coaxially with each other, and the input side in-row fitting surface 39 and the input side bearing fitting surface 41 of the input-side housing element 27 are arranged coaxially with each other. Therefore, in the assembled state of the housing 15 in which the output side in-row fitting surface 33 and the input side in-row fitting surface 39 are fitted without looseness, the input side bearing fitting surface 41 and the output side bearing fitting surface 35 are arranged coaxially with each other.

In the assembled state of the housing 15, the input shaft portion 18 of the input member 12 is supported by the input side bearing 42 so as to be able to rotate with respect to the input side bearing fitting surface 41 of the input side housing element 27. Moreover, the output shaft portion 22 of the output member 13 is supported by the output side bearing 43 so as to be able to rotate with respect to the output side bearing fitting surface 35 of the output side housing element 26. As a result, the input member 12 and the output member 13 are arranged coaxially with each other and coaxially with the pressed surface 32 of the housing 15. Furthermore, in this state, the pair of input member side engaging portions 20 and the output member side engaging portion 23 are arranged on the inner side in the radial direction of the pressed surface 32 of the housing 15. Note that, regarding the reverse input blocking clutch 6, in a case where it is desired to raise the performance of switching from the locked state to the unlocked state (unlocking performance) to a higher level, which will be described later, the coaxiality and inclination of the input member 12 and the output member 13 must be strictly managed. In that case, a general bearing utilization method such as changing each of the input side bearing 42 and the output side bearing 43 from being a single-row rolling bearing as illustrated in the drawings to a double-row rolling bearing may be applied.

In this example, each engaging element 16 of the pair of engaging elements 16 corresponds to an engaging element of the present invention. Each engaging element 16 is arranged on the inner side in the radial direction of the pressed surface 32. Each engaging element 16 includes an engaging element main body 44 and a link member 45 connected to the engaging element main body 44 so as to be able to pivot.

In this example, the engaging element main body 44 is configured by combining a plurality of parts as illustrated in FIGS. 14 to 19. Hereinafter, the overall structure of the engaging element main body 44 and the structure of each part of the engaging element main body 44 will be described in order.

The engaging element main body 44 has a substantially semicircular plate shape, includes a pair of pressing surfaces 46 facing the pressed surface 32, a pivot support shaft 47 constituting a pivot support portion, and an engaging element side output engaging portion 48 that engages with the output member side engaging portion 23.

In this example, the outer peripheral surface of the engaging element main body 44 is composed of a convex arc-shaped outer side surface in the radial direction corresponding to the arc of the engaging element main body 44, and a crank-shaped inner side surface in the radial direction corresponding to the chord of the engaging element main body 44. Note that regarding the engaging element main body 44, the radial direction refers to the direction indicated by the arrow X in FIG. 6 and orthogonal to the chord of the engaging element main body 44, and corresponds to the direction the pressing surface 46 moves when going away from or toward the pressed surface 32. Moreover, the width direction of the engaging element main body 44 means the direction indicated by the arrow Y in FIG. 6 parallel to the chord of the engaging element main body 44.

In this example, the pair of engaging elements 16 are arranged on the inner side in the radial direction of the pressed surface 32 in a state in which the outer side surfaces in the radial direction of the engaging element main bodies 44 face toward opposite sides, and the inner side surfaces in the radial direction of the engaging element main bodies 44 face each other. In a state in which the pair of engaging elements 16 are arranged on the inner side in the radial direction of the pressed surface 32 in this way, the inner diameter dimension of the pressed surface 32 and the dimension in the radial direction of the engaging element body 44 are regulated so that there is a gap in at least one of the portions between the pressed surface 32 and the outer side surfaces in the radial direction of the engaging element main bodies 44 and the portion between the inner side surfaces in the radial direction of the engaging element main bodies 44 that allows the engaging element main bodies 44 to move in the radial direction.

Each of the engaging element main bodies 44 has a pair of pressing surfaces 46 on the outer side surface in the radial direction. The pair of pressing surfaces 46 are portions that are pressed against the pressed surface 32 in the locked state of the output member 13, and are separated in the circumferential direction and arranged at both side portions in the circumferential direction of the outer side surface in the radial direction of the engaging element main body 44. Each of the pressing surfaces 46 protrudes further toward the pressed surface 32 than the portions of the outer side surface in the radial direction of the engaging element main body 44 that are separated from the pressing surfaces 46 in the circumferential direction. Each pressing surface 46 is composed of a partially cylindrical convex surface having a radius of curvature smaller than the radius of curvature of the pressed surface 32. Of the outer side surface in the radial direction of the engaging element main body 44, the portion separated in the circumferential direction from the pair of pressing surfaces 46 (the portion located between the pressing surfaces 46 in the circumferential direction) is a non-contact surface that does not come into contact with the pressed surface 32.

The engaging element main body 44 has an internal space 49 in the central portion in the thickness direction (axial direction) of the central portion in the width direction. The end portions on both sides in the radial direction of the internal space 49 are each open to the outer side surface in the radial direction and the inner side surface in the radial direction of the engaging element main body 44. The engaging element main body 44 has a pivot support shaft 47 arranged in the axial direction, and an intermediate portion in the axial direction of the pivot support shaft 47 is arranged in an outer side portion in the radial direction of the central portion in the width direction of the internal space 49. The pivot support shaft 47 is configured by a columnar pin, and the end portions on both sides in the axial direction are supported by portions of the engaging element main body 44 that sandwich the internal space 49 from both sides in the axial direction.

The engaging element main body 44 has an engaging element side output engaging portion 48 at a central portion in the width direction of the inner side surface in the radial direction. The engaging element side output engaging portion 48 is configured by a substantially rectangular shaped concave portion that is recessed outward in the radial direction of the central portion in the width direction of the inner side surface in the radial direction of the engaging element main body 44 (side surface on the far side with respect to the pressed surface 32).

Figure 6:
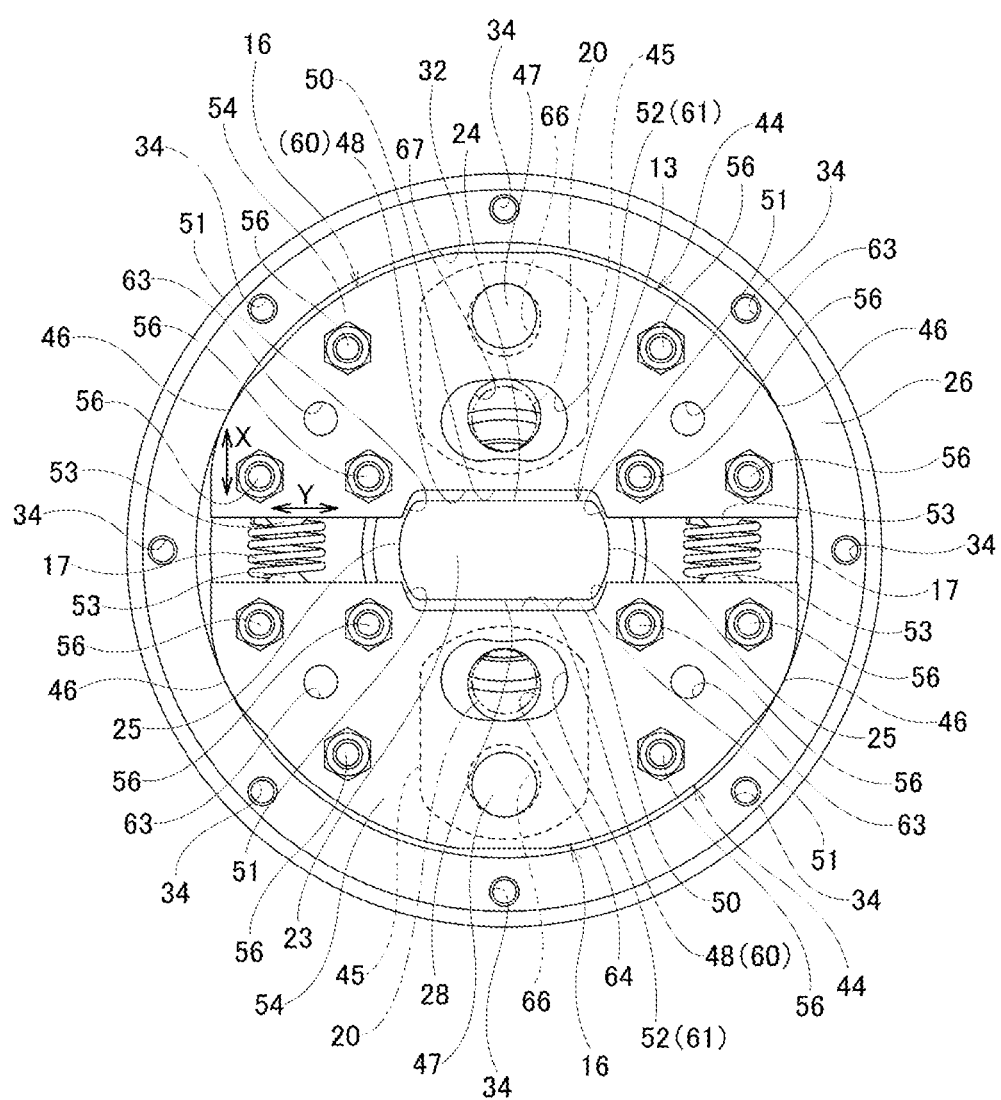
FIG. 6 is an end view as viewed from the right side in FIG. 4, and illustrates the reverse input blocking clutch of the first example in which an input member, an input side housing element, and an input side bearing are removed, in a neutral state where no rotational torque is inputted to the input member, and no rotational torque is reversely inputted to an output member.
Figure 7:
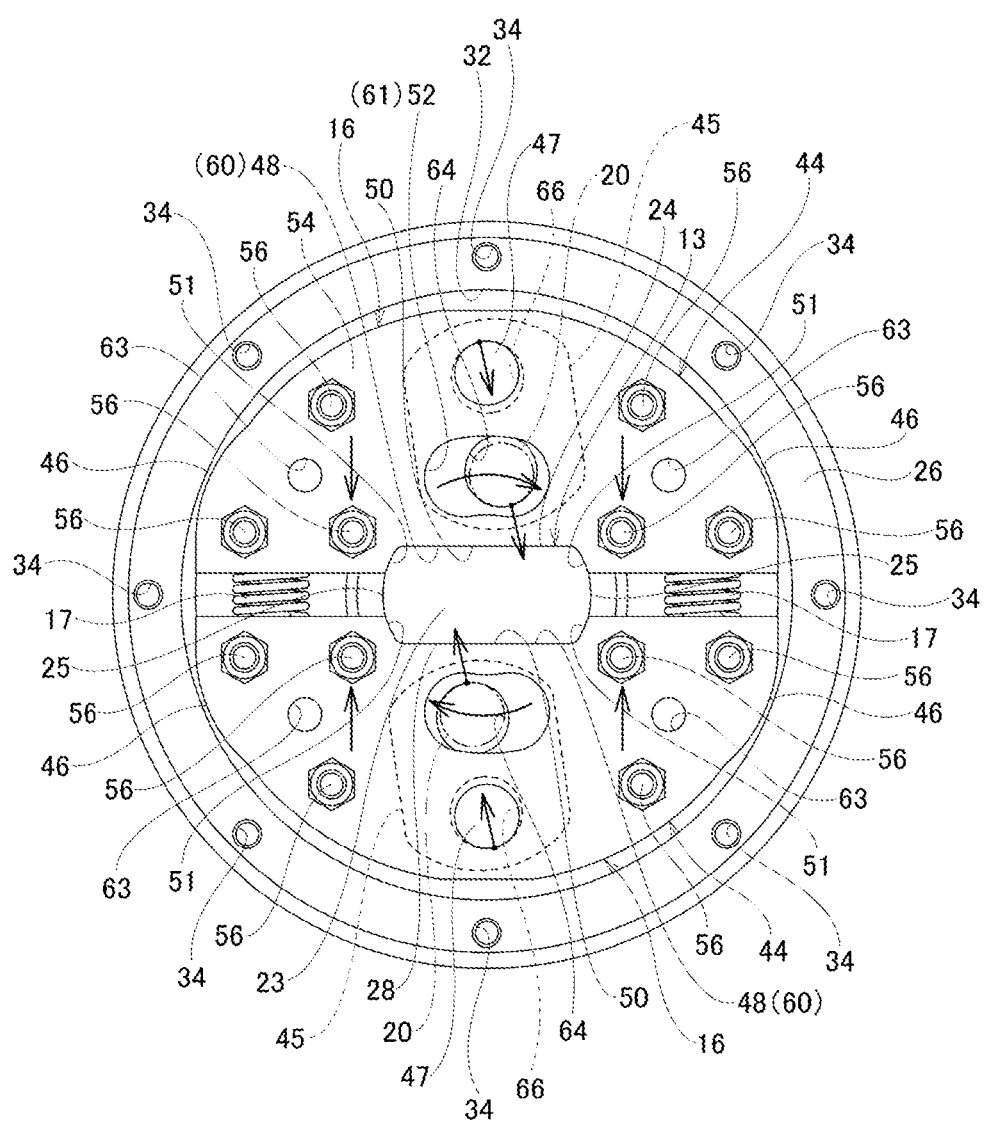
FIG. 7 is a diagram similar to that of FIG. 6 of the reverse input blocking clutch of the first example in a state where a rotational torque is inputted to the input member.

The engaging element side output engaging portion 48, as illustrated in FIGS. 6, 7, 21A and 21B, has a size such that the front half portion in the minor axis direction of the output member side engaging portion 23 can be arranged on the inner side thereof. Particularly, in this example, the engaging element side output engaging portion 48, as illustrated in FIGS. 7 and 21B, has an inner surface shape that matches the outer peripheral surface of the front half portion in the minor axis direction of the output member side engaging portion 23.

The inner surface of the engaging element side output engaging portion 48 has a bottom surface 50 and a pair of guided surfaces 51. The bottom surface 50 is configured by a flat surface orthogonal to the radial direction of the engaging element main body 44. The pair of guided surfaces 51 are located at the end portions on both sides in the width direction of the engaging element main body 44 of the inner surface of the engaging element side output engaging portion 48, and face each other in the width direction. The pair of guided surfaces 51 are configured by a pair of concave curved surfaces that are inclined in directions such that the distance between them increases while going in a direction toward the inner side in the radial direction of the engaging element main body 44, or in other words, while going in a direction away from the pressed surface 32 in the radial direction of the engaging element main body 44.

Each of the guided surfaces 51 can come into contact with each of the guide surfaces 25 of the output member side engaging portion 23, and is configured by a partially cylindrical concave surface having a radius of curvature of the same size as the guide surface 25 or a radius of curvature slightly larger than that of the guide surface 25. In other words, in this example, the engaging element side output engaging portion 48, as illustrated in FIGS. 7 and 21B, has an inner surface shape that matches the outer peripheral surface of the front half portion in the minor axis direction of the output member side engaging portion 23. In other words, it is possible to bring the bottom surface 50 of the engaging element side output engaging portion 48 into surface contact with the side surface 24 of the output member side engaging portion 23, and to bring the pair of guided surfaces 51 of the engaging element side output engaging portion 48 into surface contact with the front half portion in the minor axis direction of the pair of guide surfaces 25 of the output member side engaging portion 23. Note that the guided surface may be configured by a non-cylindrical concave surface such as a partially elliptical cylindrical concave surface.

The engaging element main body 44 has an insertion hole 52 in the inner side portion in the radial direction of the central portion in the width direction. The insertion hole 52 is configured by an arc-shaped elongated hole that penetrates in the axial direction through the inner side portion in the radial direction of the central portion in the width direction of the engaging element main body 44 and extends in the circumferential direction. The insertion hole 52 has a size that allows the input member side engaging portion 20 to be loosely inserted. More specifically, when the input member side engaging portion 20 is inserted inside the insertion hole 52, a gap in the circumferential direction and a gap in the radial direction of the engaging element main body 44 exist between the input member side engaging portion 20 and the inner surface of the insertion hole 52. Therefore, the input member side engaging portion 20 is able to displace with respect to the insertion hole 52 (engaging element main body 44) in the rotational direction of the input member 12 due to the existence of the gap in the circumferential direction, and the insertion hole 52 (engaging element main body 44) is able to displace in the radial direction of the engaging element main body 44 with respect to the input member side engaging portion 20 due to the existence of the gap in the radial direction of the engaging element main body 44. In other words, the size of the insertion hole 52 is regulated so that, when the reverse input blocking clutch 6 described later is operated, the inner circumferential edge of the insertion hole 52 and the input member side engaging portion 20 do not interfere with each other to hinder the operation.

The engaging element main body 44 has protruding convex portions 53 protruding inward in the radial direction at portions on both sides in the width direction of the inner side surface in the radial direction. The convex portions 53 protrude inward in the radial direction from a central portion in the thickness direction (axial direction) at portions on both sides in the width direction of the radial inner surface of the engaging element main body 44. The convex portions 53 are used for holding each of the springs 17 of the pair of springs 17.

The engaging element main body 44 is configured by combining a plurality of parts. More specifically, the engaging element main body 44 has a pair of main body plates 54, a pair of intermediate plates 55, a pivot support shaft 47, and a plurality of bolts 56 and nuts 57 which are connecting members.

The pair of main body plates 54 are parts that form both side portions in the thickness direction of the engaging element main body 44, and are arranged so as to overlap in the axial direction. Each main body plate 54 is a press-molded part that is formed by punching a metal plate such as a steel plate by press working, and has a substantially semicircular plate shape. In a state in which the engaging element main body 44 is assembled, the main body plate 54 has convex surfaces 58 that form pressing surfaces 46 at two positions on the outer side surface in the radial direction that are separated in the circumferential direction. In other words, a pair of convex surfaces 58 that are provided at portions of the outer side surface in the radial direction of each of the main body plates 54 having a phase that coincides in the circumferential direction forms the pressing surfaces 46. In other words, the engaging element main body 44 includes a pair of pressing surfaces 46 and has four convex surfaces 58. The main body plate 54 has a circular support hole 59 at the outer side portion in the radial direction of the central portion in the width direction. In the assembled state of the engaging element main body 44, the main body plate 54 has a plate side output engaging portion 60 at a central portion in the width direction of the inner side surface in the radial direction that forms the engaging element side output engaging portion 48. In other words, a pair of the plate side output engaging portions 60 arranged apart from each other in the axial direction forms the engaging element side output engaging portion 48. In the assembled state of the engaging element main body 44, the main body plate 54 has a penetrating through hole 61 that penetrates through the inner side portion in the radial direction of the central portion in the width direction, and forms the insertion hole 52. The engaging element main body 44 has a plurality (three in the illustrated example) of through holes 62 respectively in both side portions in the width direction, and has positioning holes 63 in both side portions in the width direction (one positioning hole for each side in the illustrated example) at locations separated from the plurality of through holes 62.

The pair of intermediate plates 55 are members that form an intermediate portion in the thickness direction of the engaging element main body 44. Each intermediate plate 55 is a press-molded part that is formed by punching a metal plate such as a steel plate by press working, and has a substantially fan-like plate shape. A pair of intermediate plates 55 are sandwiched between side portions in the width direction of the pair of main body plates 54. Each intermediate plate 55 has a convex portion 53 at an intermediate portion in the width direction of the inner side surface in the radial direction. The convex portion 53 protrudes further inward in the radial direction than the inner side surface in the radial direction of the pair of main body plates 54. The portion of the intermediate plate 55 other than the convex portion 53 is arranged between the pair of main body plates 54. In particular, the outer side surface in the radial direction of the intermediate plate 55 is located further on the inner side in the radial direction than the outer side surface in the radial direction of the pair of main body plates 54, and does not come in contact with the pressed surface 32. The intermediate plate 55 has through holes 64 at a plurality of locations that are aligned with the through holes 62 of the pair of main body plates 54. The intermediate plate 55 has a positioning hole 65 at a position that is aligned with the positioning hole 63 of the pair of main body plates 54.

The pair of main body plates 54 and the pair of intermediate plates 55 are connected and fixed together by screwing nuts 57 onto the tip-end portions of a plurality of bolts 56 that have been inserted through the through holes 62 in the pair of main body plates 54, and the through holes 64 in the pair of intermediate plates 55 that are aligned with each other, and then further tightening. Note that in the structure of this example, when performing this kind of connecting and fixing operation, by inserting a positioning rod for this operation into the positioning holes 63 of the pair of main body plates 54 and the positioning holes 65 of the pair of intermediate plates 55 that are aligned with each other, the work of aligning the through holes 62 of the pair of main body plates 54 and the through holes 64 of the pair of intermediate plates 55 can be performed easily. In the structure of this example, in a state in which the pair of main body plates 54 and the pair of intermediate plates 55 are connected and fixed together, an internal space 49 is formed between the main body plates 54 in the width direction and between the intermediate plates 55 in the width direction.

The pivot support shaft 47 is configured by a columnar pin. The end portions on both sides in the axial direction of the pivot support shaft 47 are internally fitted and fixed to the support holes 59 of the pair of main body plates 54 by press fitting. The intermediate portion in the axial direction of the pivot support shaft 47 is arranged inside the internal space 49.

The link member 45 is a press-molded part that is formed by punching a metal plate such as a steel plate by press working, and has a substantially rectangular plate shape or a substantially oblong disk shape, and is arranged in the internal space 49 of the engaging element main body 44 (between the main body plates 54).

The thickness dimension of the link member 45 is smaller than the width dimension in the axial direction of the internal space 49 (equal to the distance between the side surfaces of the pair of main body plates 54 facing each other, and equal to the thickness dimension of the intermediate plate 55). The link member 45 has a pivotally supported portion 66 at the end portion on one side in the longitudinal direction thereof, and has an engaging element side input engaging portion 67 at the end portion on the other side in the longitudinal direction thereof.

The pivotally supported portion 66 is configured by a circular hole, and the pivot support shaft 47 is inserted through the circular hole. As a result, the end portion on the one side in the lengthwise direction of the link member 45 is pivotally connected to (supported by) the pivot support shaft 47. The engaging element side input engaging portion 67 is configured by a circular hole, and the input member side engaging portion 20 is inserted through the circular hole. As a result, the end portion on the other side in the lengthwise direction of the link member 45 is pivotally connected to the input member side engaging portion 20.

Figure 9:
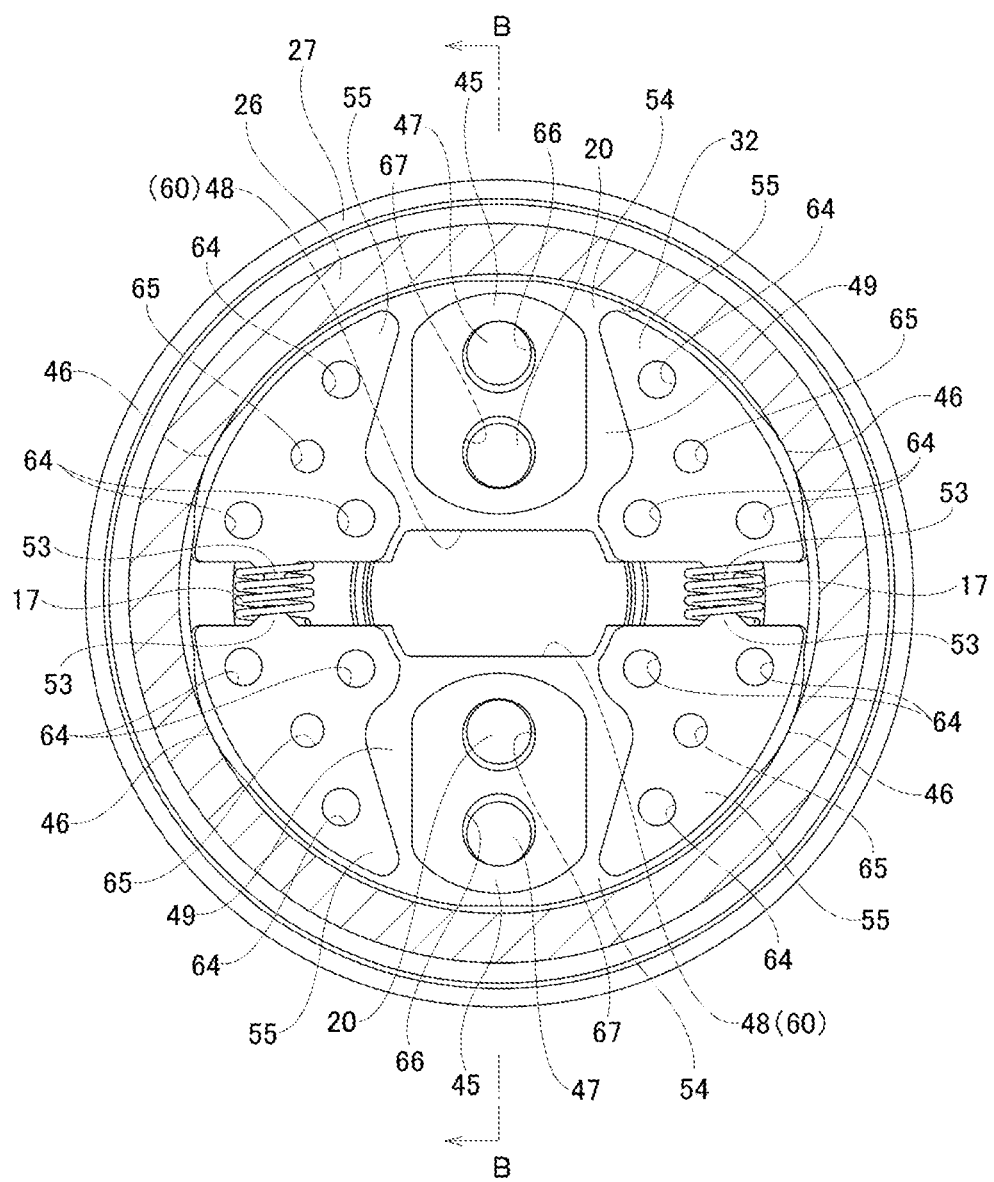
FIG. 9 is an end view as viewed from the left side in FIG. 4, and illustrates the reverse input blocking clutch of the first example in which the output member, an end portion on the left side of an output-side housing element, an output side bearing, a main body plate on the left side, bolts and nuts have been removed.
Figure 10:
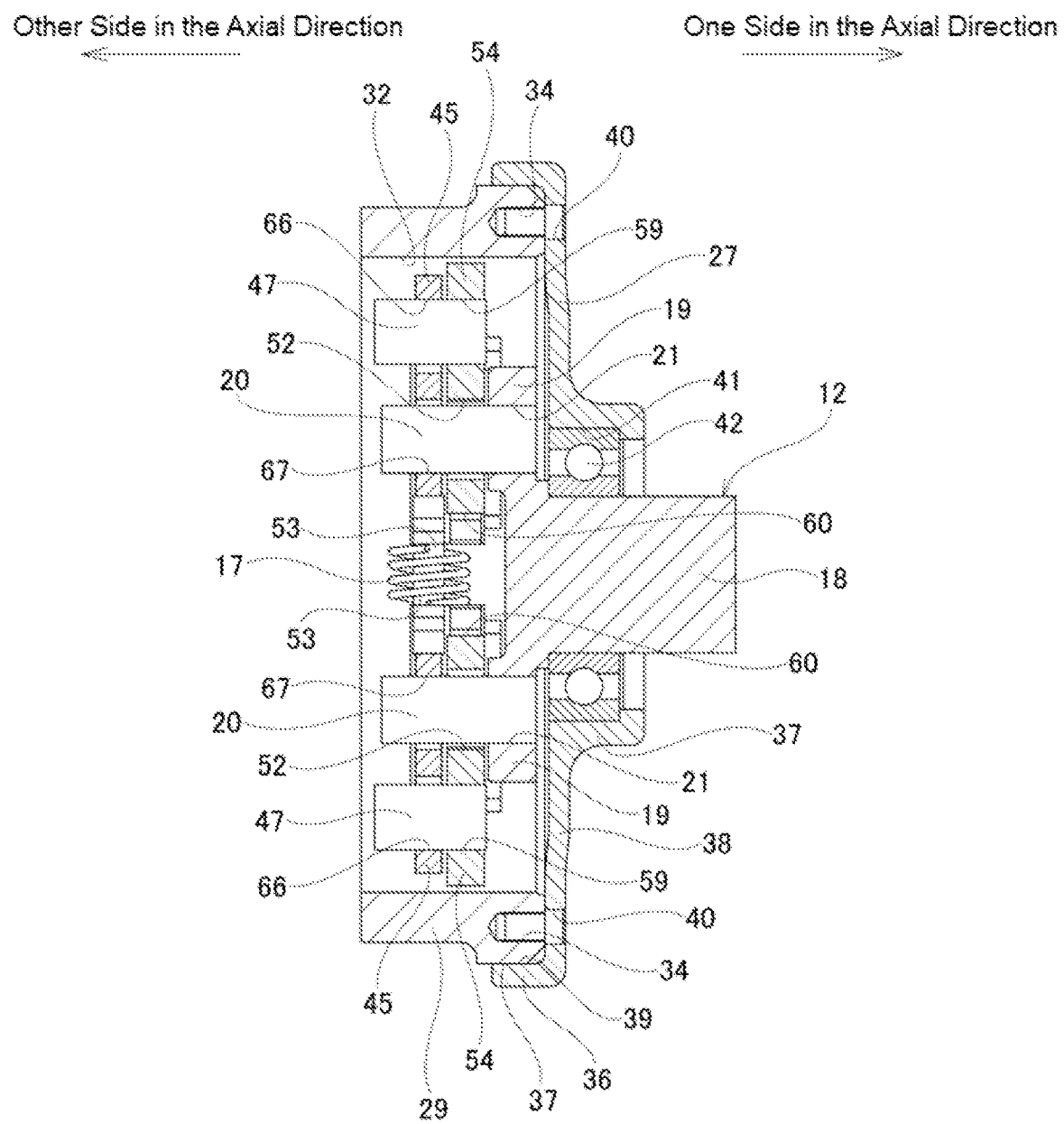
FIG. 10 is a cross-sectional view taken along section line B-B in FIG. 9 of the reverse input blocking clutch of the first example.
Figure 11:
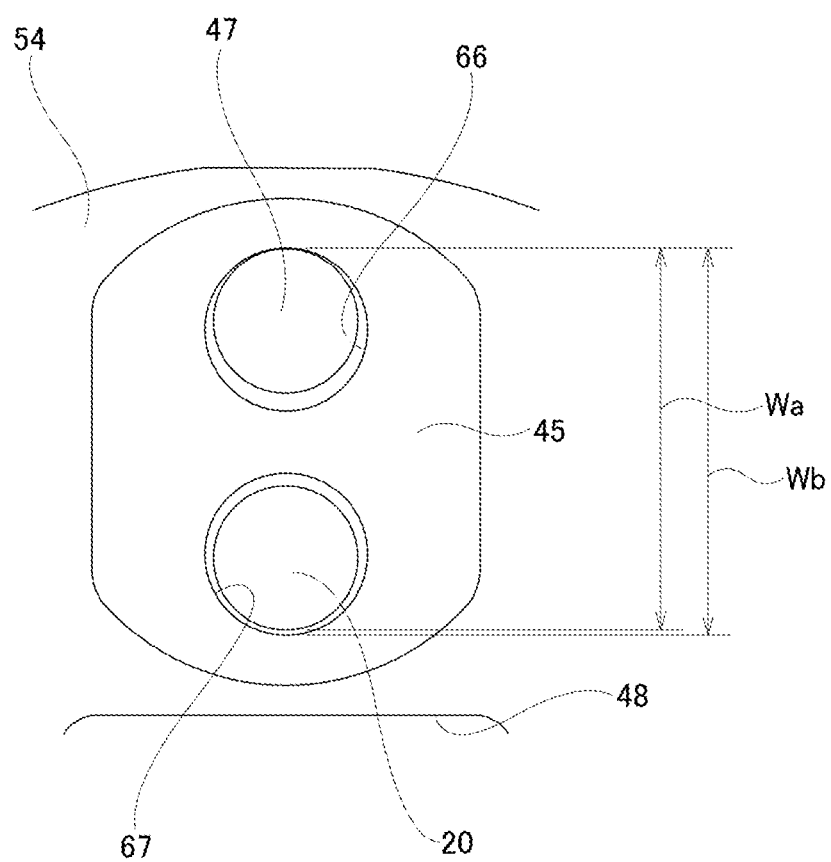
FIG. 11 is an enlarged view of a central portion in the left-right direction of the upper half portion in FIG. 9 of the reverse input blocking clutch of the first example.
Figure 12:
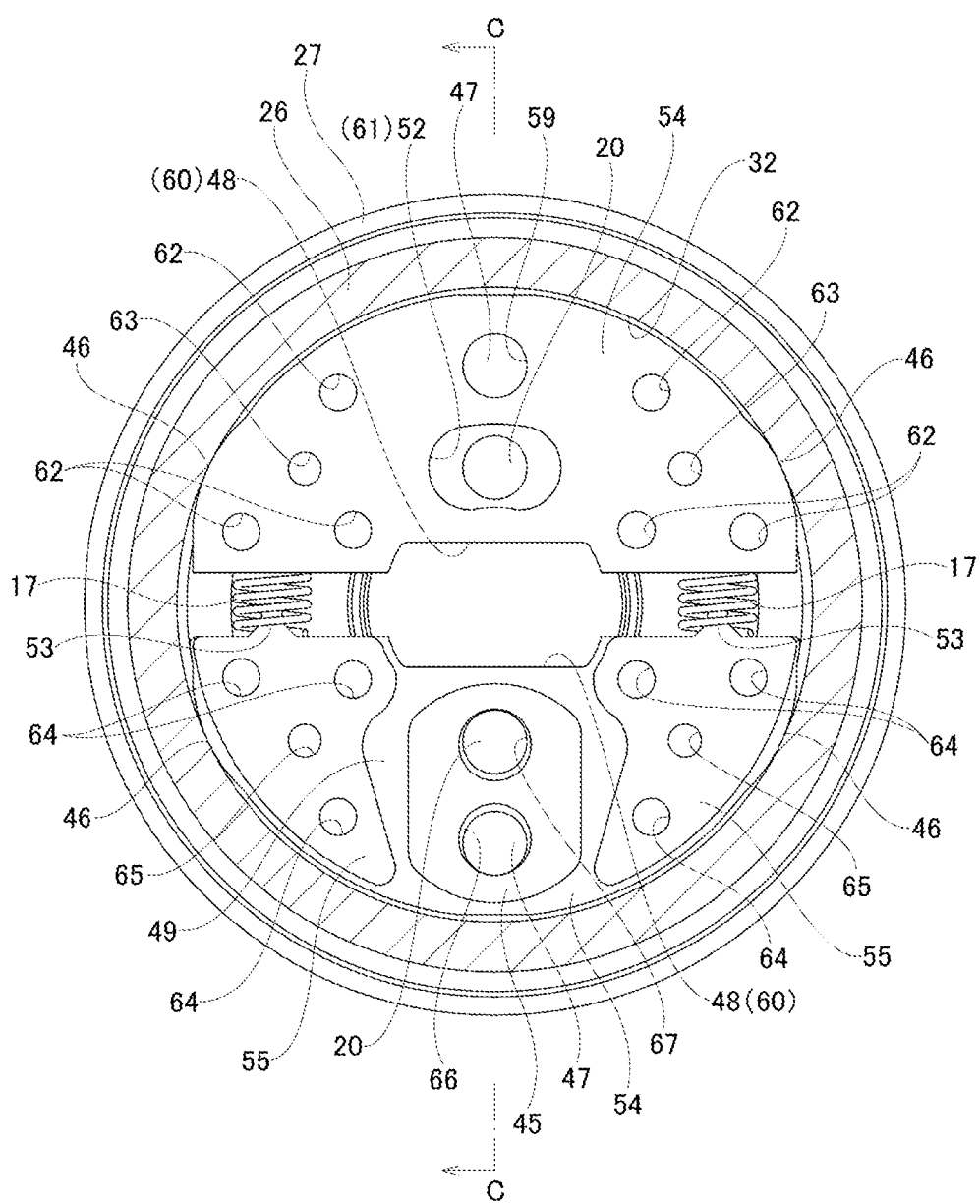
FIG. 12 is an end view of the reverse input blocking clutch of the first example illustrated in FIG. 9 in which an intermediate plate and a link member are removed from the upper half portion thereof.
Figure 13:
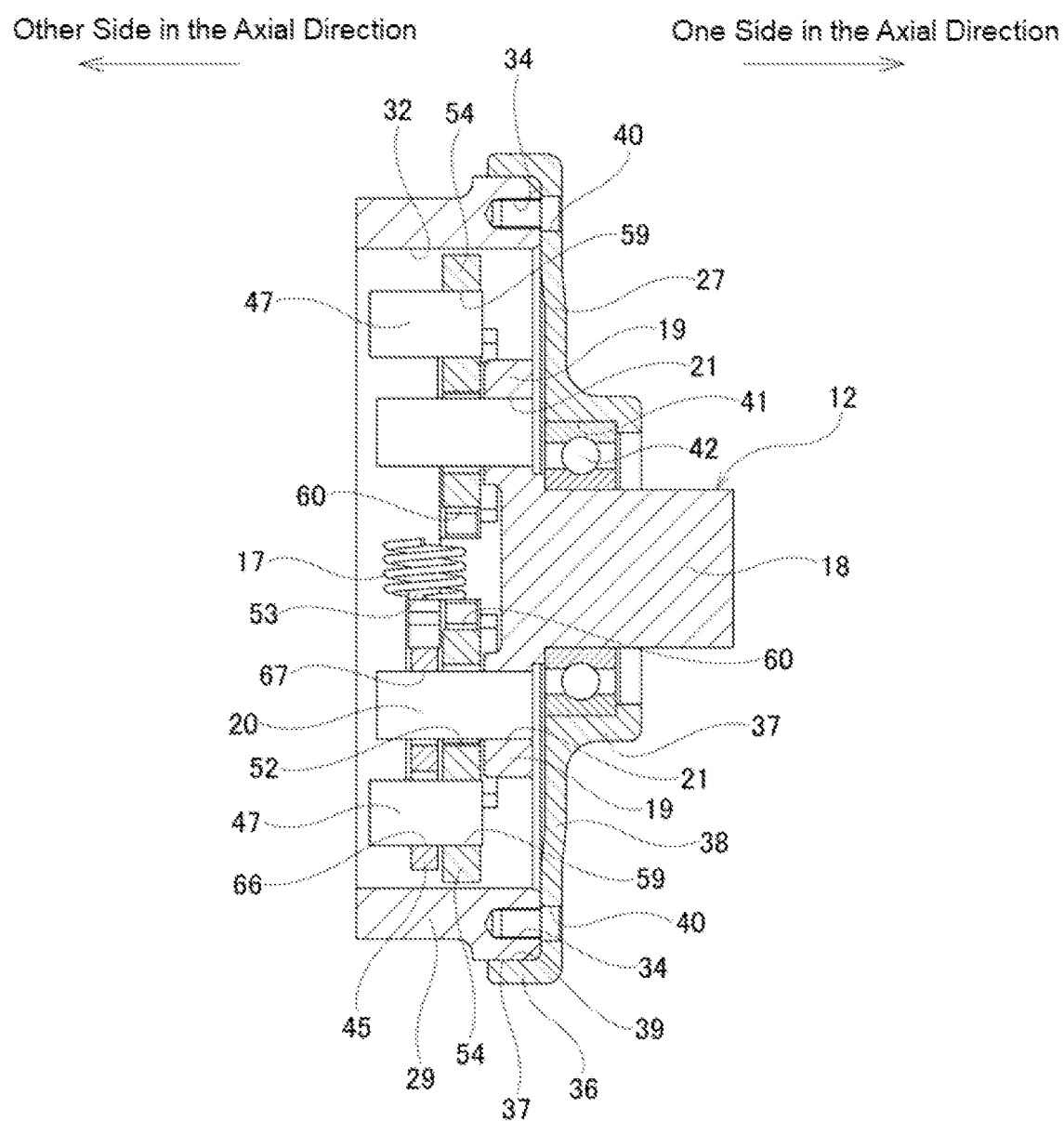
FIG. 13 is a cross-sectional view taken along section line C-C in FIG. 12 of the reverse input blocking clutch of the first example.
Figure 14:
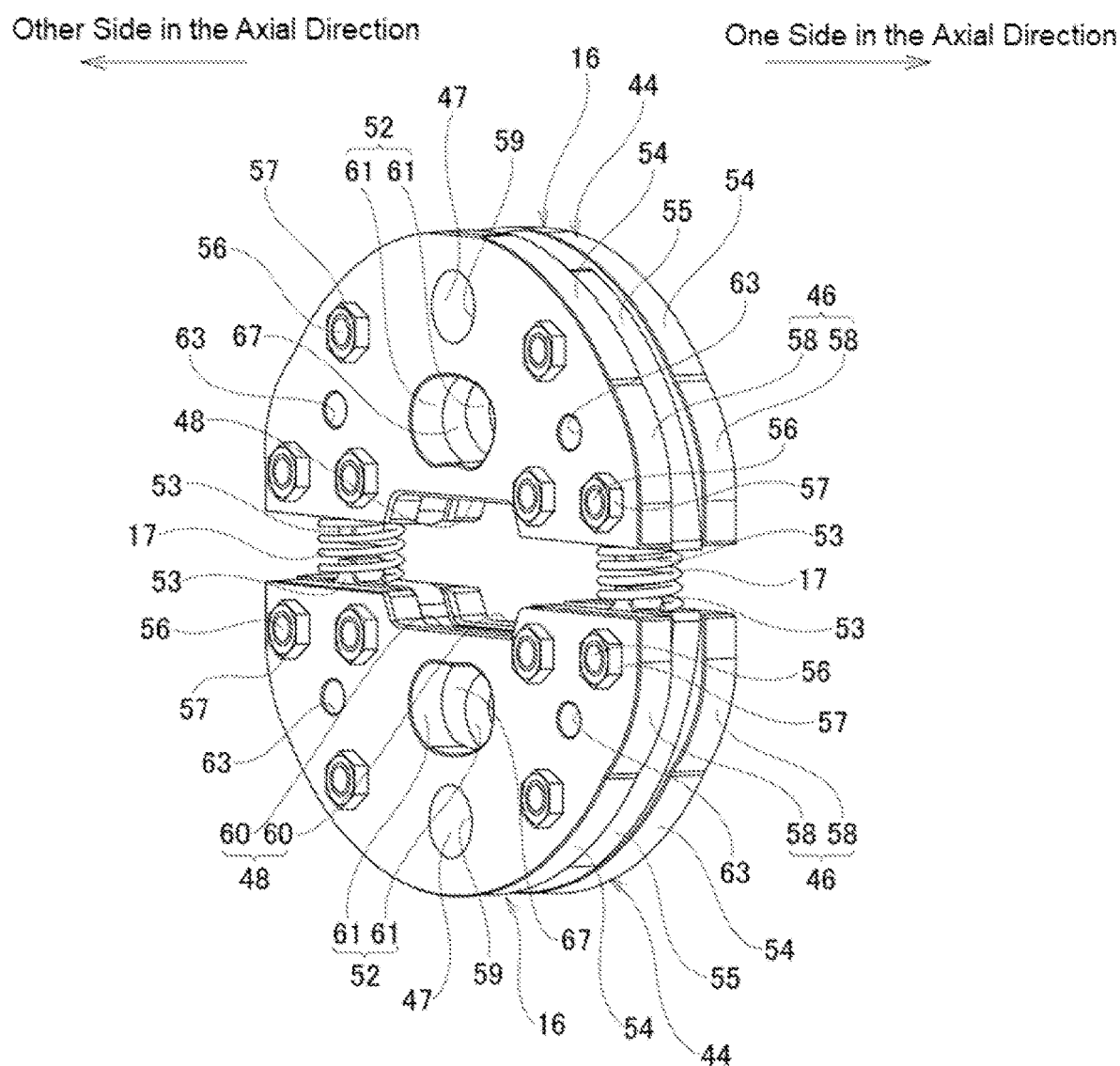
FIG. 14 is a perspective view of a pair of engaging elements and springs of the reverse input blocking clutch of the first example.
Figure 15:
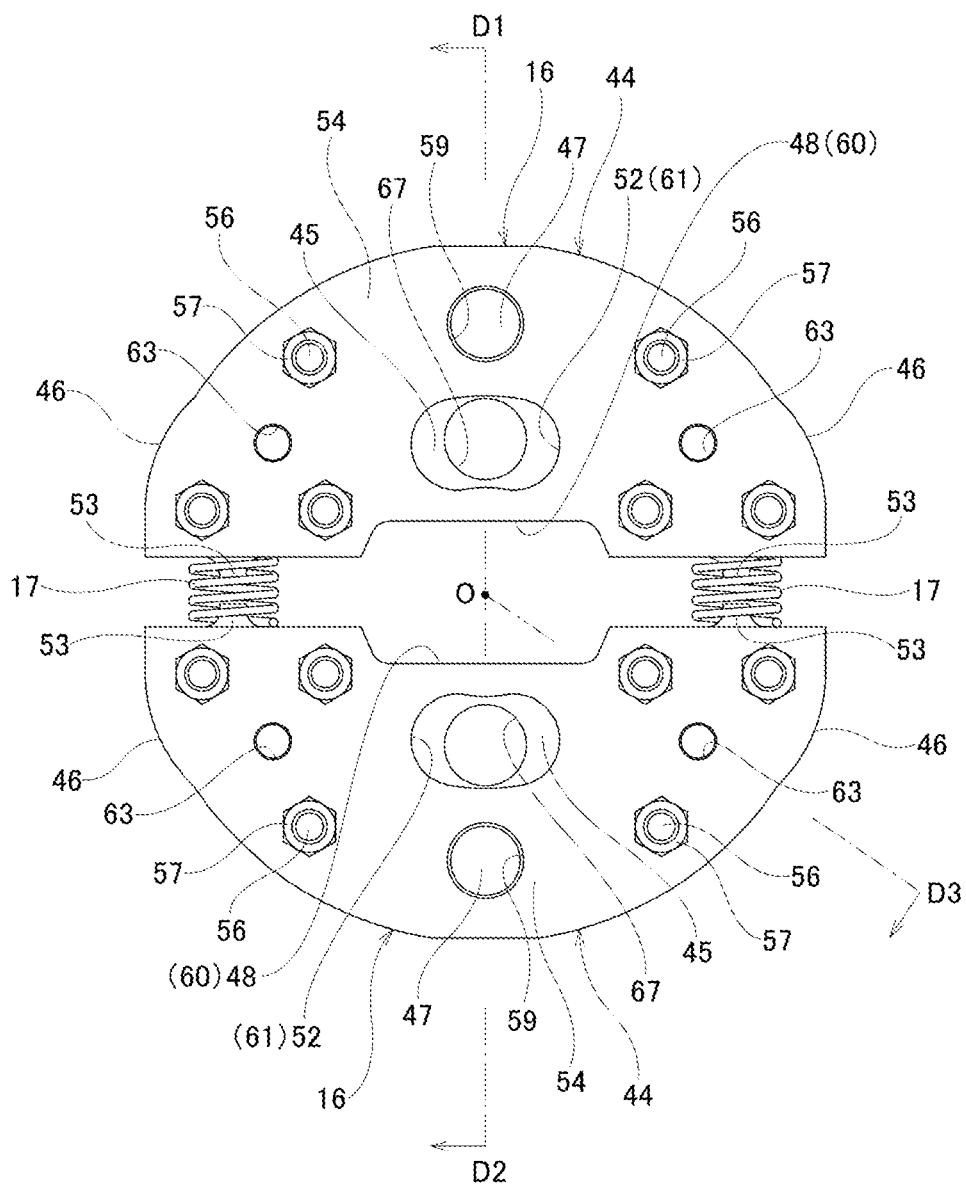
FIG. 15 is an end view of the pair of engaging elements and springs of the first example as viewed from the output member side in the axial direction.

The inner diameter of the pivotally supported portion 66 is set to be larger than the outer diameter of the pivot support shaft 47, and the inner diameter dimension of the engaging element side input engaging portion 67 is set to be larger than the outer diameter dimension of the input member side engaging portion 20. Furthermore, in this example, as illustrated in FIGS. 6 and 9, in a state in which the pair of pressing surfaces 46 of the engaging element 16 come in contact with the pressed surface 32, and the input member side engaging portion 20 is located in the central portion in the width direction of the engaging element main body 44, the distance Wa between the edges of the ends on the far sides from each other of the pivot support shaft 47 and the input member side engaging portion 20, as illustrated in FIG. 11, is set so as to be equal to or less than the distance Wb between the edges of the ends on the far sides from each other of the pivotally supported portion 66 and the engaging element side input engaging portion 67 (Wa≤Wb). Note that, from the aspect of facilitating the assembly of the reverse input blocking clutch 6, the difference (Wb−Wa) between these intervals Wa and Wb is preferably as large as possible; however, on the other hand, from the aspect of immediately being able to achieve an unlocked state by moving the engaging element 16 inward in the radial direction when rotational torque is inputted to the input member 12, the difference (Wb−Wa) is preferably as small as possible.

A pair of springs 17 are arranged between the portions on both sides in the width direction of the inner side surfaces in the radial direction of the pair of engaging element main bodies 44 of the pair of engaging elements 16. In other words, the pair of springs 17 are arranged in locations that are separated from the output member side engaging portion 23 in the width direction of the engaging element main bodies 44. The pair of springs 17 elastically press each engaging element 16 outward in the radial direction, or in other words, presses each engaging element 16 toward the pressed surface 32. As a result, in a neutral state in which torque is not applied to either the input member 12 or the output member 13, the pressing surfaces 46 of each engaging element 16 are set to a state of contact with the pressed surface 32.

In this example, each spring 17 is composed of a coil spring. By inserting the convex portions 53 of the pair of engaging elements 16 inside the portions on both sides in the axial direction of the springs 17, the springs 17 are prevented from falling out from between the inner side surfaces in the radial direction of the pair of engaging element main bodies 44. However, by providing concave portions (notches) that are recessed outward in the radial direction in the portions on both sides in the width direction of the inner side surfaces in the radial direction of each engaging element main body (intermediate plate), and inserting the end portions on both sides of the springs into the concave portions, it is also possible to prevent the springs from falling out from the pair of engaging element main bodies. Moreover, as the biasing means for elastically pressing the pair of engaging elements 16 in directions toward the pressed surface, not only a coil spring but also a leaf spring, a disc spring, or the like may be used. Furthermore, the biasing means, in addition to being arranged so as to be sandwiched between the engaging elements, may be arranged so as to be sandwiched between the engaging elements and the output member.

Figure 16:
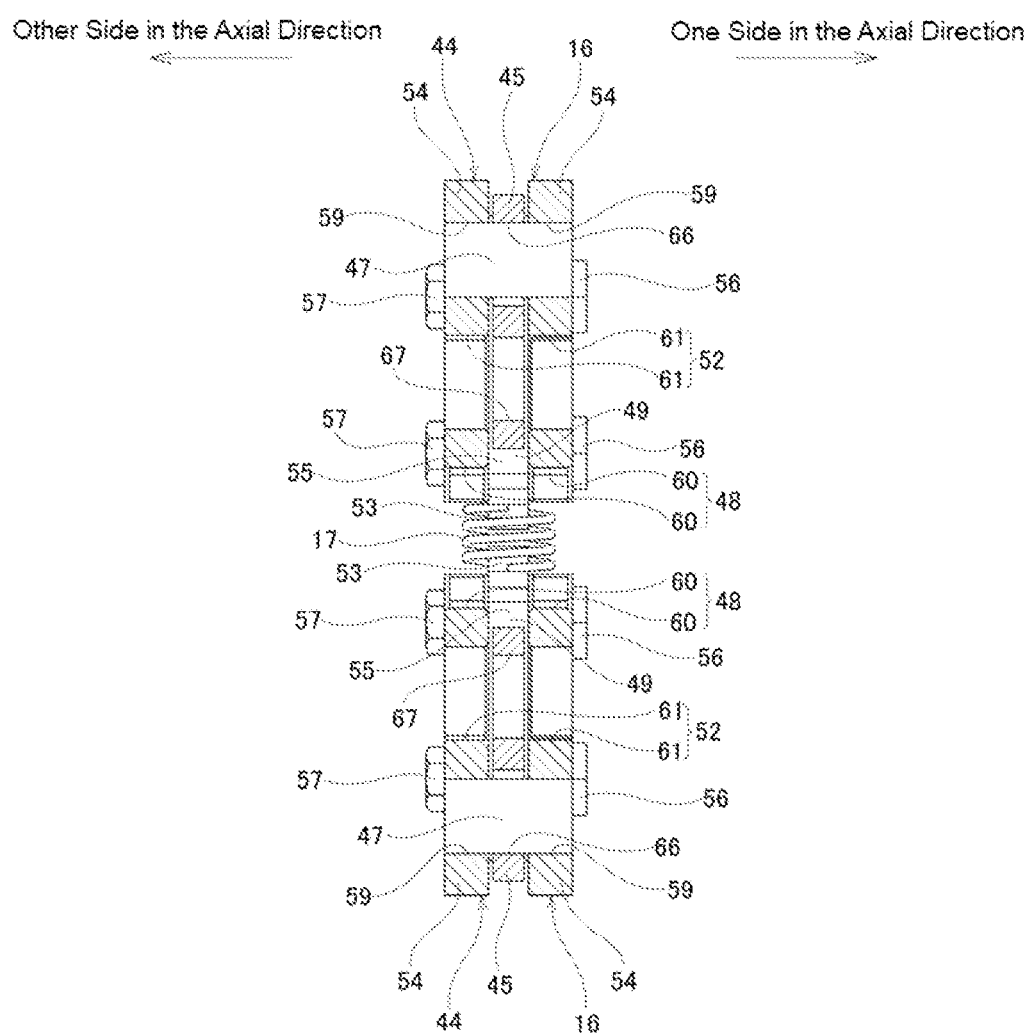
FIG. 16 is a cross-sectional view taken along section line D1-D2 in FIG. 15 of the pair of engaging elements and springs of the first example.
Figure 17:
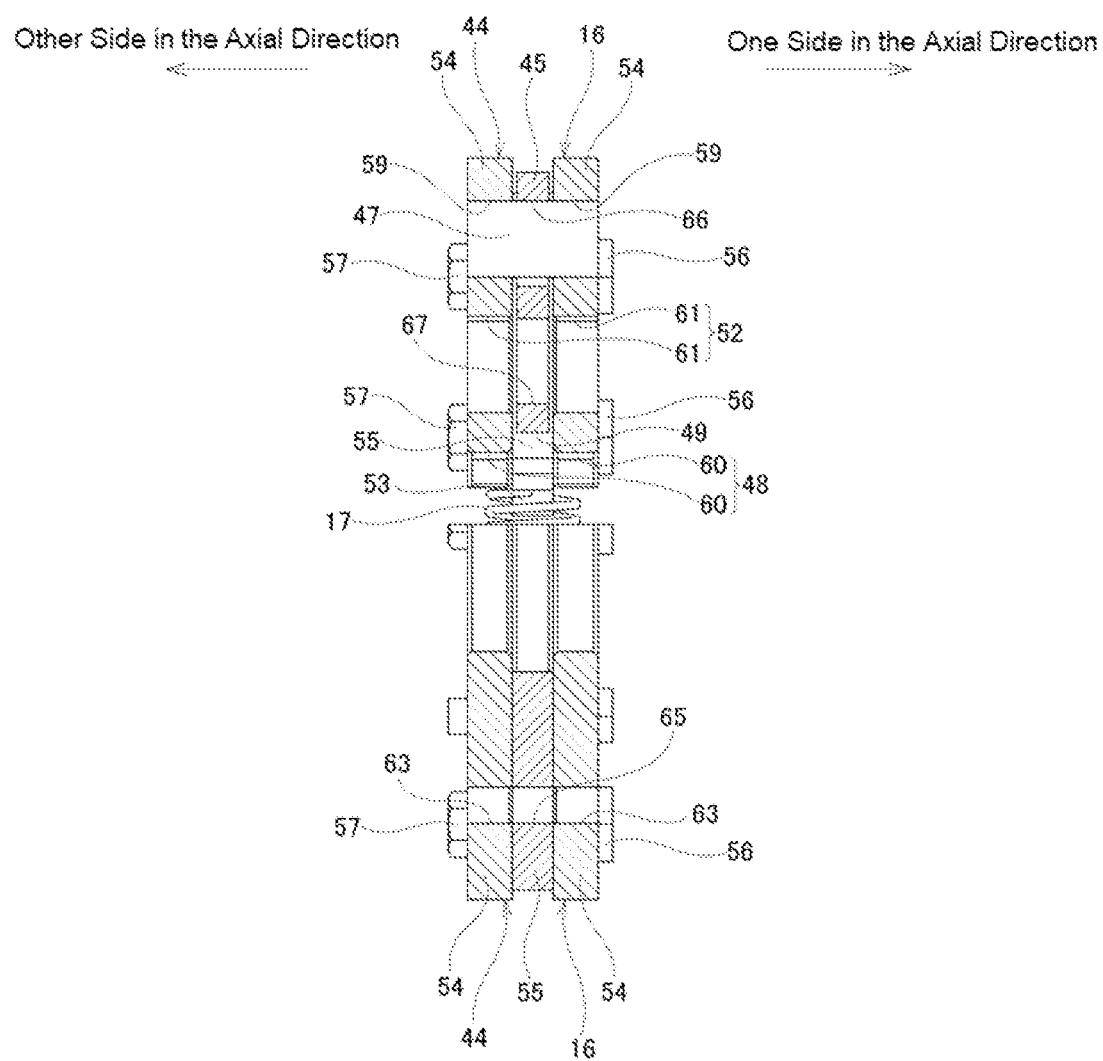
FIG. 17 is a cross-sectional view taken along section line D1-O-D3 in FIG. 15 of the pair of engaging elements and springs of the first example.
Figure 18:
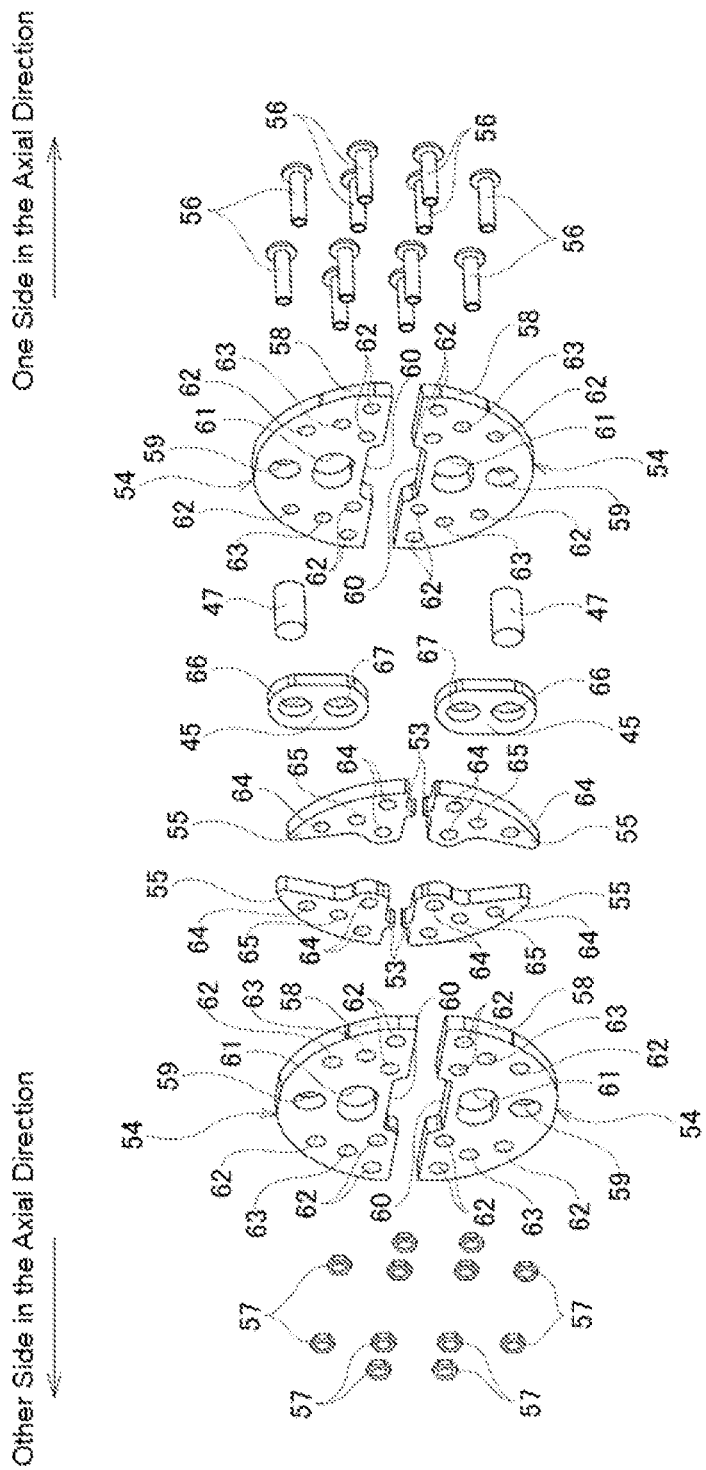
FIG. 18 is an exploded perspective view of the pair of engaging elements of the first example.
Figure 19:
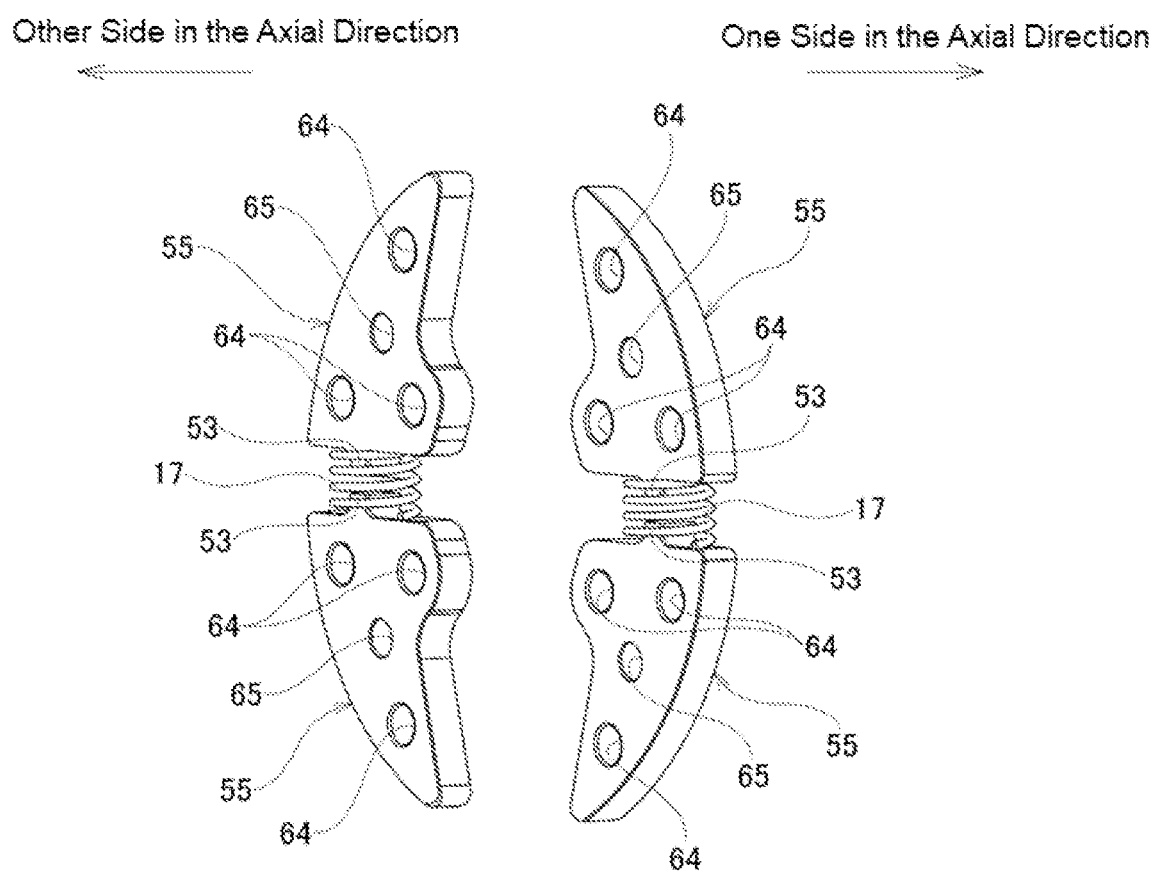
FIG. 19 is a perspective view of the intermediate plates and springs of the pair of engaging elements of the first example.
Figure 20:
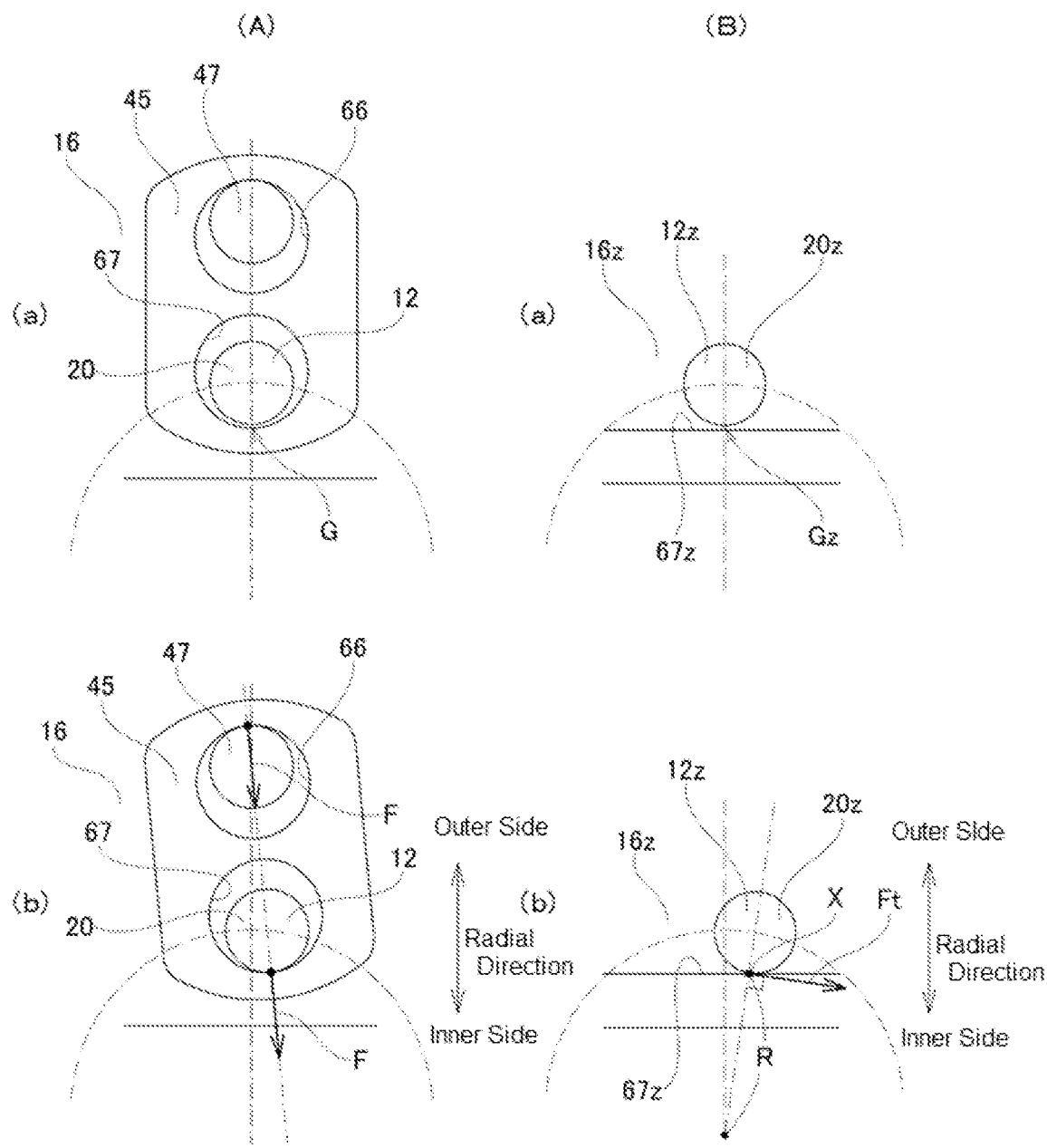
FIG. 20A (a) is a view related to the reverse input blocking clutch of the first example, and illustrates engagement between the engaging element side input engaging portion and the input member side engaging portion in a state before rotational torque is inputted to the input member.
FIG. 20B (a) is a view related to the reverse input blocking clutch of a reference example, and illustrates engagement between the engaging element side input engaging portion and the input member side engaging portion in a state before rotational torque is inputted to the input member.
Figure 21:
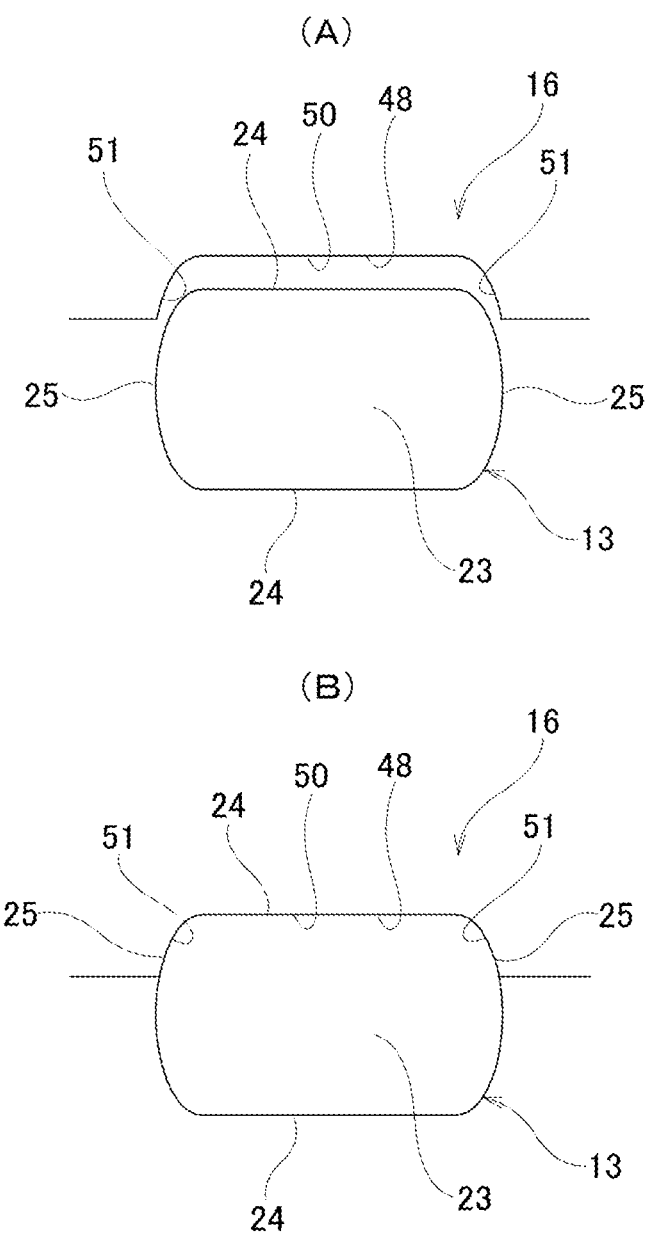
FIGS. 21A and 21B are views related to the reverse input blocking clutch of the first example, and illustrate states before and after engagement between the output member side engaging portion and the engaging element side output engaging portion.
Figure 22:
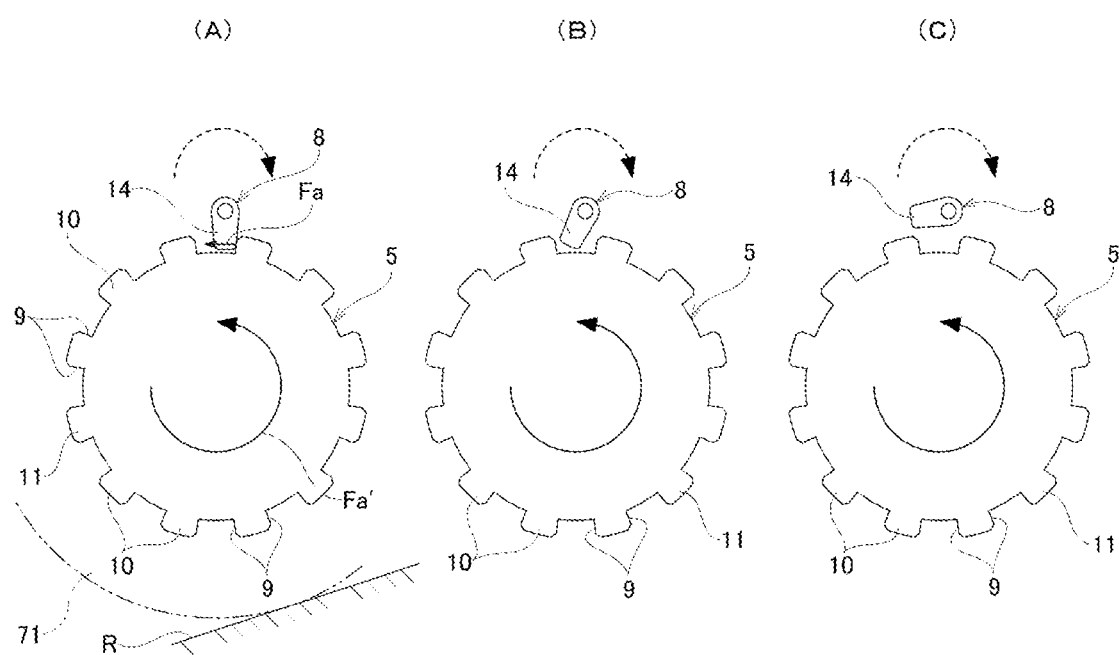
FIGS. 22A to 22C are views related to the rotation locking device of the first example and are for describing the rotation direction of an engaging member when releasing the parking locking mechanism in a case where a force is applied to a locking gear to rotate the locking gear in the forward rotation direction.
Figure 23:
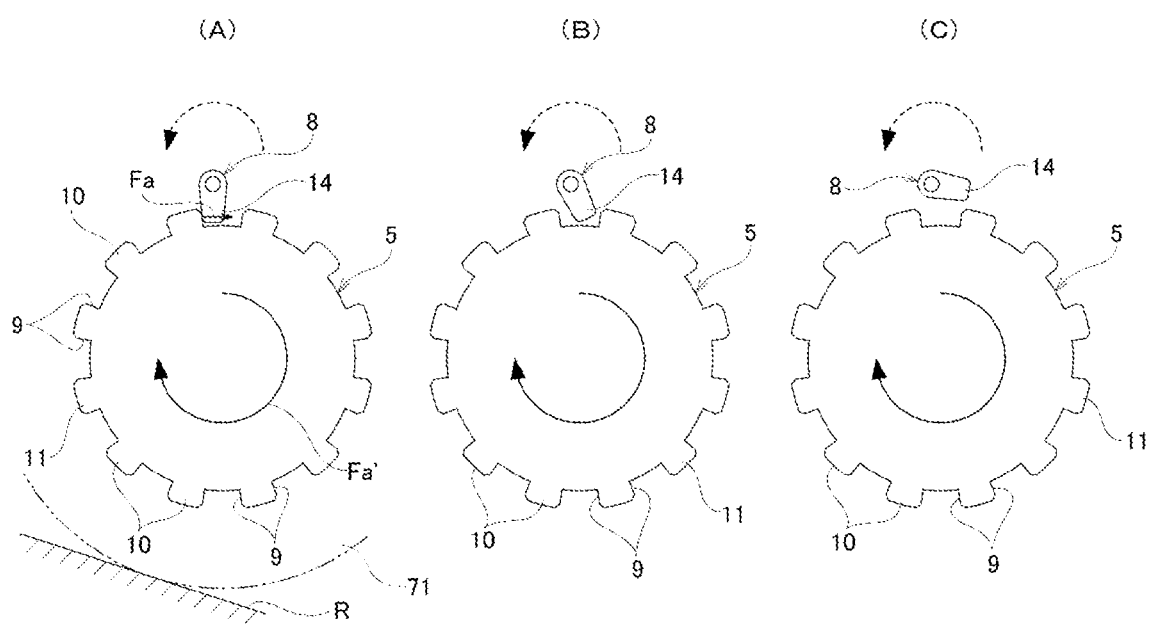
FIGS. 23A to 23C are views related to the rotation locking device of the first example and are for describing the rotation direction of the engaging member when releasing the parking locking mechanism in a case where a force is applied to the locking gear to rotate the locking gear in the reverse rotation direction.

In this example, the outer diameter dimension of the spring 17 is smaller than the axial thickness dimension of the engaging element main body 44. Therefore, as illustrated in FIGS. 16 and 17, the springs 17 do not protrude toward both sides (toward the outside) in the axial direction further than the side surfaces on both sides in the axial direction of the engaging element main body 44.

Note that the reason why the pressing surfaces 46 of the pair of engaging elements 16 are to be in contact with the pressed surface 32 in the neutral state is that when rotational torque is reversely inputted to the output member 13, the locked state can be immediately realized.

In the assembled state of the reverse input blocking clutch 6 of this example, the pair of input member side engaging portions 20 of the input members 12 arranged on the one side in the axial direction are inserted in the axial direction into the insertion holes 52 of the pair of engaging elements 16 (penetrating through holes 61 of the pair of main body plates 54) and the engaging element side input engaging portions 67, and the output member side engaging portion 23 of the output member 13 arranged on the other side in the axial direction is inserted in the axial direction between the engaging element side output engaging portions 48 of the pair of engaging elements 16. In other words, the pair of engaging elements 16 is arranged so as to sandwich the output member side engaging portion 23 from the outside in the radial direction by the engaging element side output engaging portions 48.

Next the operation of the reverse input blocking clutch 6 will be described.

When a rotational torque is input to the input member 12 from the input side mechanism, as illustrated in FIG. 7, the input member side engaging portions 20 rotate in the rotational direction (clockwise direction in the example in FIG. 7) of the input member 12 inside the insertion holes 52 of the engaging element main bodies 44. As a result, while the link members 45 pivot around the pivot support shafts 47, the pivot support shafts 47 are pulled by the input member side engaging portions 20 via the link members 45, which causes the pair of engaging elements 16 to move in directions away from the pressed surface 32 (toward the inside in the radial direction). Accordingly, the pressing surfaces 46 of the pair of engaging elements 16 are separated from the pressed surface 32, and the pair of engaging element side output engaging portions 48 hold the output member side engaging portion 23 of the output member 13 from both sides in the radial direction such that the output member side engaging portion 23 and the pair of engaging element side output engaging portions 48 engage with no looseness. As a result, the rotational torque inputted to the input member 12 is transmitted to the output member 13 via the pair of engaging elements 16 and outputted from the output member 13.

In particular, in the structure of the present example, when each engaging element 16 moves away from the pressed surface 32 (inward in the radial direction), as illustrated going from FIG. 6 to FIG. 7, and also going from FIG. 21A to FIG. 21B, a pair of guide surfaces 25 located on both sides in the major axis direction of the front half portion in the minor axis direction of the output member side engaging portion 23 restricts the movement of the engaging element 16 in the width direction by guiding a pair of guided surfaces 51 located on both sides in the width direction of the engaging element side output engaging portion 48. Then, as illustrated in FIGS. 7 and 21B, the bottom surface 50 of the engaging element side output engaging portion 48 comes into surface contact with the side surface 24 of the output member side engaging portion 23, and the pair of guided surfaces 51 of the engaging element side output engaging portion 48 come into surface contact with the pair of guide surfaces 25 of the output member side engaging portion 23. Therefore, in the structure of this example, it is possible to effectively prevent the engaging elements 16 from shifting in the width direction and coming into contact with the pressed surface 32 after the locked state is released. In the structure of this example, guiding the movement of the engaging elements 16 inward in the radial direction can be performed by using the output member side engaging portion 23, and therefore the number of parts can be reduced as compared with a structure incorporating another part used only for performing the guidance.

Moreover, in the structure of this example, the pair of guided surfaces 51 of the engaging element side output engaging portion 48 is composed of a pair of concave curved surfaces inclined in a direction in which the distance between the guided surfaces 51 increases as going toward the inside in the radial direction, and the pair of guide surfaces 25 of the output member side engaging portion 23 is composed of a pair of convex curved surfaces that match the pair of concave curved surfaces of the pair of guided surfaces 51. Therefore, as illustrated in FIG. 21A, in a state where the engaging elements 16 are separated toward the outside in the radial direction from the output member side engaging portion 23, a gap is formed between the pair of guided surfaces 51 and the pair of guide surfaces 25, and the size of the gap (dimension in the width direction) increases as going toward the outside in the radial direction. Therefore, in the structure of this example, in a state in which the engaging elements 16 are separated toward the outside in the radial direction from the output member side engaging portion 23, movement of the engaging elements 16 in the width direction and the rotation direction can be appropriately allowed, and it is possible to effectively prevent an unreasonable force from being applied to the engaging elements 16.

Figure 8:
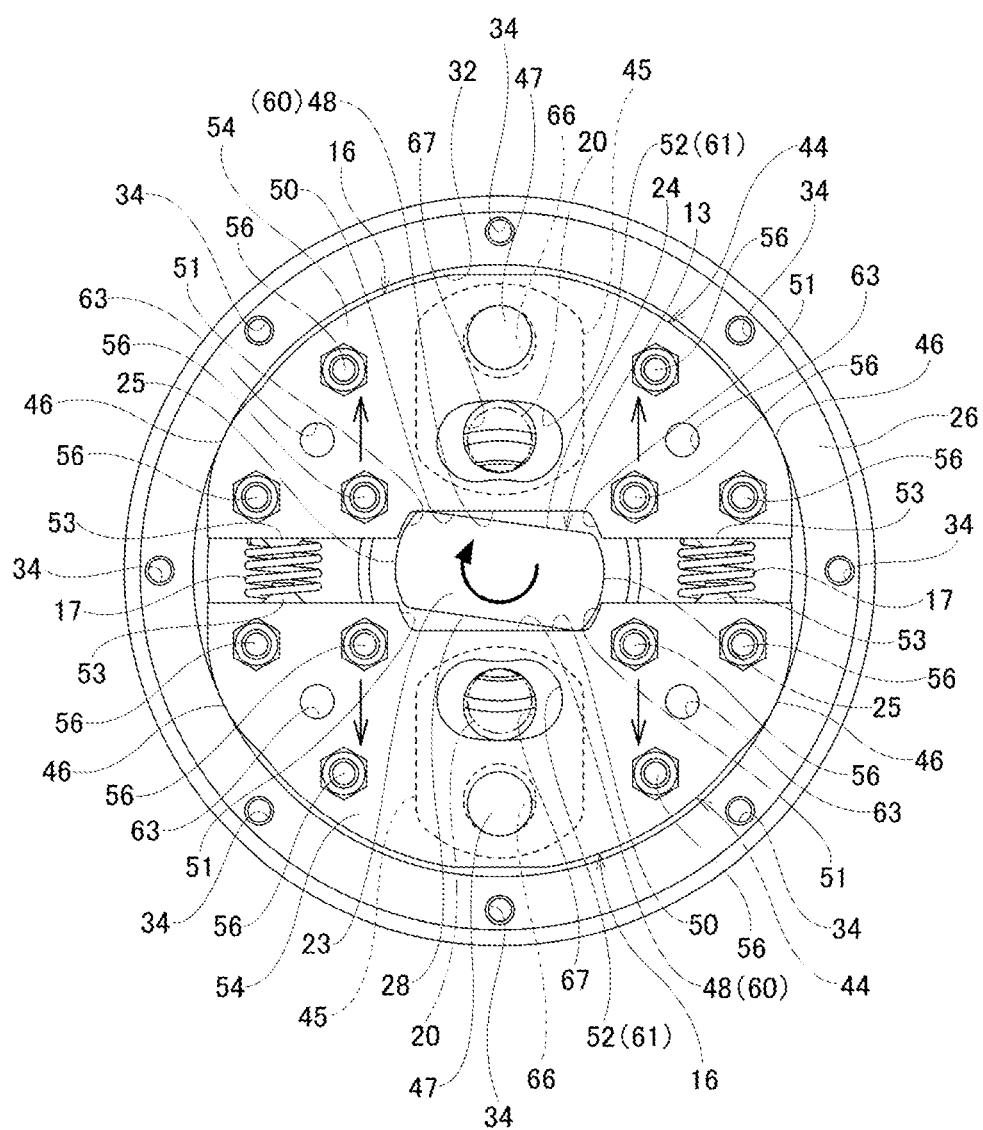
FIG. 8 is a diagram similar to that of FIG. 6 of the reverse input blocking clutch of the first example in a state where a rotational torque is reversely inputted to the output member.

On the other hand, when rotational torque is reversely inputted to the output member 13 from the output side mechanism, as illustrated in FIG. 8, the output member side engaging portion 23 rotates in the rotation direction of the output member 13 (clockwise in the example of FIG. 8) on the inner side of the pair of engaging element side output engaging portions 48. Then, the corner portions, which are the connecting portions between the side surfaces 24 of the output member side engaging portion 23 and one of the guide surfaces 25 of the pair of guide surfaces 25, press the bottom surfaces 50 of the engaging element side output engaging portions 48 of the engaging elements 16 outward in the radial direction, which causes the engaging elements 16 to move in directions toward the pressed surface 32 (outward in the radial direction). Due to this, the pressing surfaces 46 of the pair of engaging elements 16 are pressed against the pressed surface 32, and these pressing surfaces 46 frictionally engage with the pressed surface 32. As a result, by transmitting the rotational torque that is reversely inputted to the output member 13 to the housing 15 that is fixed to other members and does not rotate (supported by the housing 15), the rotational torque is completely blocked and is not transmitted to the input member 12. More specifically, the pair of engaging elements 16 are pressed tightly (sandwiched) between the output member side engaging portion 23 and the pressed surface 32, and the output member 13 is locked so that the pressing surfaces 46 do not slide with respect to (rotate relative to) the pressed surface 32.

In this example, each of the engaging elements 16 has pressing surfaces 46 at two locations on the outer side surface in the radial direction of the engaging element main body 44 and separated in the circumferential direction, and thus when rotational torque is reversely inputted to the output member 13, the frictional engagement force between the pressed surface 32 and the pressing surfaces 46 can be increased. However, it is also possible to employ construction in which there is only one pressing surface located on the outer side surface in the radial direction of the engaging element main body at one location in the circumferential direction. Moreover, in this example, the pressing surfaces 46 are configured by a convex surface 58 provided on each of the pair of main body plates 54, but the pressing surfaces can also be formed on the intermediate plate.

With the reverse input blocking clutch 6 of this example, it is possible to smoothly switch from the locked state to the unlocked state when rotational torque is inputted to the input member 12. This point will be described by referencing FIGS. 20A and 20B for comparing this example with a reference example.

FIGS. 20A (a) and 20A (b) illustrate the mutual positional relationship between a part of the input member 12 and a part of the engaging element 16 in the structure of this example. More specifically, FIG. 20A (a) illustrates the positional relationship in the locked state illustrated in FIG. 8 where the input member side engaging portions 20 are located in the central positions in the width direction of the engaging elements 16 and the link members 45 are in a state of being closest to the inside in the radial direction. FIG. 20A (b) illustrates the positional relationship in a state starting from the state illustrated in FIG. 20A (a), in which, by inputting rotational torque T to the input member 12, the input member side engaging portions 20 rotate in the rotation direction of the input member 12 (clockwise in the illustrated example), and a translational load F begins to act from the input member side engaging portions 20 onto the pivot support shafts 47 via the link members 45.

On the other hand, FIGS. 20B (a) and 20B (b) illustrate the mutual positional relationship between a part of the input member 12 and a part of the engaging element 16z in the case of structure of a reference example in which there are no link members, and the integrally configured engaging elements 16z have engaging element side input engaging portions 67z and engaging element side output engaging portions (not illustrated). More specifically, FIG. 20B (a) illustrates the positional relationship in the locked state when the input member side engaging portion 20z is located at a central portion in the width direction of the engaging element 16z. FIG. 20B (b) illustrates the positional relationship in a state starting from the state illustrated in FIG. 20B (a), in which, by inputting rotational torque T to the input member 12z, the input member side engaging portions 20z rotate in the rotation direction (clockwise in the illustrated example) of the input member 12z, the input member side engaging portions 20z come into contact with the engaging element side input engaging portions 67z of the engaging elements 16z, and a translational load Ft based on the rotational torque T begins to act at the contact portions X between the input member side engaging portions 20z and the engaging element side input engaging portions 67z.

In the structure of the reference example, as illustrated in FIG. 20B (b), the direction of the translational load Ft, or in other words, the direction of the load acting on the engaging elements 16z from the input member 12z is greatly inclined with respect to the radial direction of the engaging elements 16z (the far-near direction of the engaging elements 16z relative to the pressed surface), which is the direction in which the engaging elements 16z should move when switching from the locked state to the unlocked state.

On the other hand, in the structure of this example, as illustrated in FIG. 20A (b), the direction of the translational load F, or in other words, the load acting on the engaging elements 16 from the input member 12, is a direction substantially parallel to the radial direction of the engaging elements 16 (the far-near direction of the engaging elements 16 relative to the pressed surface 32), which is the direction in which the engaging elements 16 should move when switching from the locked state to the unlocked state. In other words, the angle between the direction of the translational load F and the direction in which the engaging elements 16 should move is smaller than the angle between the direction of the translational load Ft and the direction in which the engaging elements 16z should move in the structure of the reference example. That is, in the structure of this example, the rotational torque T inputted to the input member 12 can be efficiently converted into a load for moving the engaging elements 16 inward in the radial direction. Therefore, with the structure of this example, it is possible to smoothly switch from the locked state to the unlocked state when rotational torque is inputted to the input member 12.

Note that in the structure of this example, in the state illustrated in FIG. 20A (a), the size of the gap G that exists between the inner side surfaces in the radial direction of the input member side engaging portion 20 and the inner peripheral surface of the engaging element side input engaging portion 67 of the link member 45 (difference (Wb−Wa) described above), and in the structure of the reference example, in the state illustrated in FIG. 20B (a), the size of the gap Gz that exists between the inner side surface in the radial direction of the input member side engaging portion 20z and the engaging element side input engaging portion 67z are both preferably as large as possible from the aspect of facilitating the assembly of the reverse input blocking clutch; however, on the other hand, when rotational torques are inputted to the input member 12, 12z, the gaps are preferably as small as possible from the aspect of being able to immediately achieve an unlocked state by moving the engaging elements 16, 16z inward in the radial direction. Therefore, when manufacturing a reverse input blocking clutch, it is necessary to adjust the sizes of the gaps G and Gz to appropriate sizes in consideration of these circumstances.

In the structure of the reference example, in order to adjust the size of the gap Gz, the portion of the engaging element side input engaging portion 67z that comes into contact with the inner side surface in the radial direction of the input member side engaging portion 20z may need to be finished with high precision by cutting; and in that case, the cost would be expected to increase. However, in the structure of this example, it is possible to adjust the size of the gap G by simply managing the distance between the centers of the pivotally supported portion 66 of the link member 45 and the engaging element side input engaging portion 67, and because the link member 45 can be manufactured by inexpensive press working, it is easy to reduce the cost.

Operation of Parking Locking Mechanism

In an automobile provided with a parking locking mechanism to which the rotation locking device 4 of this example is applied, when the shift lever is shifted to select the P range, the actuator 7 rotationally drives the input member 12 of the reverse input blocking clutch 6. The rotation inputted to the input member 12 is transmitted to the output member 13, and as illustrated in order from FIG. 22C to FIG. 22B to FIG. 22A, by the engaging member 8 rotating in the counterclockwise direction, or as illustrated in order from FIG. 23C to FIG. 23B to FIG. 23A, by the engaging member 8 rotating in the clockwise direction, the engaging claw portion 14 engages in any of the engaging concave portions 9 (is arranged on the inner side of an engaging concave portion 9) of the locking gear 5. As a result, the parking locking mechanism is switched to a first mode, and the rotation of the output shaft 3 that supports and fixes the locking gear 5 is restricted. In other words, the rotation of the output shaft 3 is blocked except for a slight rotation that allows the engaging claw portion 14 to displace inside the engaging concave portion 9.

In a state in which the parking locking mechanism to which the rotation locking device 4 is applied is switched to the first mode, and when the locking gear 5 tries to rotate due to the reversely inputted torque from the drive wheels, the side surface of the engaging claw portion 14 is pushed by the side surface in circumferential direction of the engaging concave portion 9. When the side surface of the engaging claw portion 14 is pushed, a force that tries to cause the engaging member 8 to rotate the engaging member 8 in a direction that would disengage the engaging concave portion 9 and the engaging claw portion 14 is applied; however, this force is supported by the reverse input blocking clutch 6, and the rotation of the engaging member 8 is prevented. As a result, rotation of the drive wheels is also prevented.

When the shift lever is shifted from the P range to select another range, the input member 12 of the reverse input blocking clutch 6 is rotationally driven. The rotation inputted to the input member 12 is transmitted to the output member 13, and as illustrated in order from FIG. 22A to FIG. 22B to FIG. 22C, by the engaging member 8 rotating in the clockwise direction, or as illustrated in order from FIG. 23A to FIG. 23B to FIG. 23C, by the engaging member 8 rotating in the counterclockwise direction, the engagement between the engaging concave portion 9 and the engaging claw portion 14 is released. As a result, the parking locking mechanism is switched to the second mode, and rotation of the output shaft 3 is allowed.

Particularly, the parking locking mechanism, in which the rotation locking device 4 of this example is applied, has a function in which, when switching from the first mode to the second mode in a case where a force Fa in the rotation direction of the locking gear 5 is applied to the engaging member 8 from the locking gear 5, the engaging member 8 rotates in the same direction as the force Fa and the engagement between the engaging claw portion 14 and the engaging concave portion 9 is released.

In other words, in a state in which the parking locking mechanism is operated and the parking brake is not activated when parking an automobile on an inclined road surface, the drive wheels try to rotate when the service brake (foot brake) is released, and at the same time the locking gear 5 also tries to rotate. As a result, the side surface in the circumferential direction of the engaging concave portion 9 of the locking gear 5 is strongly pressed against the side surface of the engaging claw portion 14 of the engaging member 8 causing the force Fa in the rotational direction to be applied to the engaging member 8. The rotation locking device 4 of this example rotates the engaging member 8 in the same direction as the force Fa when switching from the first mode to the second mode.

More specifically, in a case where, due to parking an automobile downhill and the drive wheels 71 try to roll on the road surface R, a force Fa' that tries to cause the locking gear 5 to rotate in the forward rotation direction (counterclockwise direction in FIG. 22A to FIG. 22C) is applied to the locking gear 5, a force Fa is applied to the engaging member 8 as illustrated in FIG. 22A to FIG. 22C. In this case, the rotation locking device 4 releases the engagement between the engaging claw portion 14 and the engaging concave portion 9 by rotating the engaging member 8 in the clockwise direction in FIG. 22A to FIG. 22C when switching the parking locking mechanism from the first mode to the second mode.

On the other hand, in a case where, due to parking an automobile uphill and the drive wheels 71 try to roll on the road surface R, a force Fa' that tries to cause the locking gear 5 to rotate in the reverse rotation direction (clockwise direction in FIG. 23A to FIG. 23C) is applied to the locking gear 5, a force Fa is applied to the engaging member 8 as illustrated in FIG. 23A to FIG. 23C. In this case, the rotation locking device 4 releases the engagement between the engaging claw portion 14 and the engaging concave portion 9 by rotating the engaging member 8 in the counterclockwise direction in FIG. 23A to FIG. 23C when switching the parking locking mechanism from the first mode to the second mode.

By causing the engaging member 8 to rotate in the same direction as the force Fa in the rotation direction that is applied to the engaging member 8 when switching the parking locking mechanism from the first mode to the second mode, the function of releasing the engagement between the engaging claw portion 14 and the engaging concave portion 9 can be achieved as described below.

First, the actuator 7 rotates the engaging member 8 in a predetermined specified direction.

When the specified direction coincides with the direction of the force Fa applied from the locking gear 5 to the engaging member 8, the starting current (inrush current) of the actuator 7 begins to decrease within a predetermined specified time or less, or without increasing to a specified current value. In this case, the engaging member 8 is rotated as is in the specified direction to release the engagement between the engaging claw portion 14 and the engaging concave portion 9. The specified time or current value can be obtained in advance by experiment or calculation.

In a case where the specified direction is opposite to the direction of the force Fa applied from the locking gear 5 to the engaging member 8, the starting current of the actuator 7 does not start to decrease even after the specified time has elapsed or even when the current increases to the specified current. In this case, rotating the engaging member 8 in the specified direction releases the engagement between the engaging claw portion 14 and the engaging concave portion 9.

Alternatively, it is also possible to release the engagement between the engaging claw portion 14 and the engaging concave portion 9 by finding the direction of the force Fa applied from the locking gear 5 to the engaging member 8 based on a sensor that measures the direction of torque applied to a rotating body that constitutes the drive system of an automobile, such as the output shaft 3 of the automatic transmission 2, an inclinometer, and the like, and causing the engaging member 8 to rotate in that direction.

Note that in a case where a force is not applied from the locking gear 5 to the engaging member 8 in the rotation direction, or in other words, in a case where the inner surface in the circumferential direction of an engaging concave portion 9 is not pressed against a side surface of the engaging claw portion 14, the engaging member 8 may be rotated in any direction when switching from the first mode to the second mode. Moreover, the rotation direction of the engaging member 8 when switching from the second mode to the first mode is not particularly limited.

In the rotation locking device 4 of this example, the parking locking mechanism can be switched between the first mode and the second mode by the actuator 7 rotating the engaging member 8 via the reverse input blocking clutch 6. Therefore, the parking locking mechanism in which the rotation locking device 4 of this example is applied may be more simply configured compared with a structure as in the case of the parking locking mechanism described in JP 2010-006299A in which a detent plate 103 is pivotally moved due to an actuator 101 rotating a shaft 102, and further in which by causing a rod 104 to displace due to the pivotal movement of the detent plate 103, a parking locking pole 106 is pivotally moved by a cam 108 provided at the tip-end portion of the rod 104. Note that the reverse input blocking clutch 6 can be assembled in advance.

Figure 24:
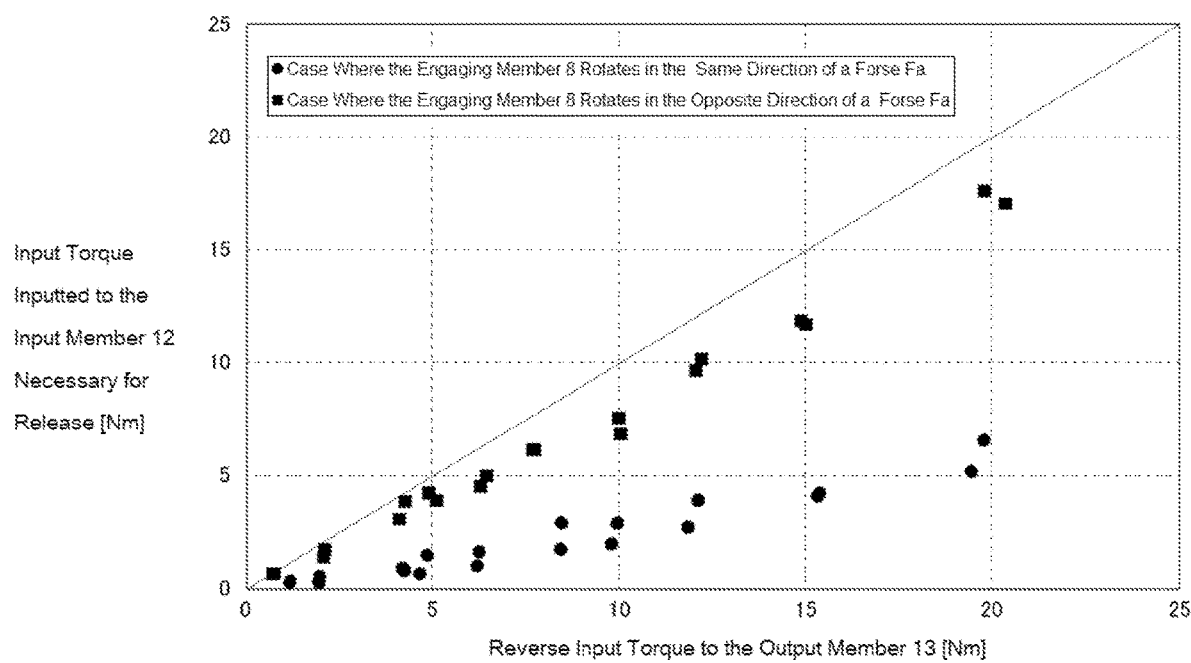
FIG. 24 is related to the rotation locking device of the first example and is a graph for explaining the effect of restricting the rotation direction of the engaging member when releasing the parking locking mechanism.

Moreover, the rotation locking device 4 of this example, in a case where a force Fa is applied from the locking gear 5 to the engaging member 8, by having a function of releasing the engagement between the engaging claw portion 14 and the engaging concave portion 9 by rotating the engaging member 8 in the same direction as the direction of the force Fa when switching the parking locking mechanism from the first mode to the second mode, is able to keep the output of the actuator 7 that rotationally drives the engaging member 8 small. More specifically, as illustrated in FIG. 24, in a case where the engaging member 8 is rotated in the same direction as the direction of the force Fa when switching from the first mode to the second mode, it is possible to release the engagement between the engaging concave portion 9 and the engaging claw portion 14 with a force (torque) that is about half that compared with a case in which the engaging member 8 is rotated in the opposite direction of the direction of the force Fa, and that is less than half the force Fa in the rotation direction that is applied from the locking gear 5 to the engaging member 8. Accordingly, it is possible to reduce the amount of power consumed by the actuator 7, and to make the actuator 7 more compact.

However, in a case where the rotation locking device 4 is configured by including the reverse input blocking clutch 6 of this example, and when a force Fa in the rotation direction is applied from the locking gear 5 to the engaging member 8, it is possible to release the engagement between the engaging claw portion 14 and the engaging concave portion 9 by rotating the engaging member 8 in a direction opposite that of the direction of the force Fa. In other words, a configuration is possible in which, when switching the parking locking mechanism from the first mode to the second mode, the engagement between the engaging claw portion 14 and the engaging concave portion 9 is released by rotating the engaging member 8 only in a predetermined specified direction regardless of the direction of the force Fa. Note that as is clear from FIG. 24, even in a case where the engaging member 8 is rotated in a direction opposite the direction of the force Fa, it is possible to release the engagement between the engaging claw portion 14 and the engaging concave portion 9 with a force that is less than the force Fa in the rotation direction that is applied from the locking gear 5 to the engaging member 8.

Note that in a case of implementing the present invention, it is also possible to use other joining means such as rivets, welding, crimping or the like as joining means for joining the input side housing element 27 and the output-side housing element 26 of the housing 15, and as joining means for joining the pair of main body plates 54 and the pair of intermediate plates 55 of the engaging element main body. Moreover, as this kind of other joining means, it is also possible to employ a joining means in which intermediate portions of joining shafts are inserted through though holes formed at locations that are aligned with each other in a plurality of parts that are to be joined together, and then fastening retaining rings at both end portions in the axial direction of the joining shafts so that the plurality of parts is held on both sides in the axial direction between these retaining rings.

Furthermore, one intermediate plate of the pair of intermediate plates can be integrally formed on one main body plate of the pair of main body plates, and the other intermediate plate of the pair of intermediate plates can be integrally formed on the other main body plate of the pair of main body plates. Alternatively, both of the pair of intermediate plates can be integrally formed on one main body plate of the pair of main body plates. By adopting these configurations, the engaging element main body can be configured by a combination of a pair of main body plates, and thus the number of parts can be reduced.

Note that in the reverse input blocking clutch 6 of the rotation locking device 4 of the first example, a configuration is adopted in which one link member 45 is pivotally arranged between a pair of main body plates 54; however, in a case of implementing the present invention, it is also possible to adopt a configuration in which a pair of link members are pivotally arranged on both sides in the thickness direction of one main body plate (the input side engaging portion pulls the engaging element main body toward the inside in the radial direction via the pair of link members).

In the rotation locking device 4 of this example, a pair of engaging elements 16 are provided as the engaging elements 16; however, as long as the engaging elements 16 have a structure capable of moving in a direction toward or away from the pressed surface 32, it is also possible to adopt a structure in which one engaging element is provided, and that one engaging element is combined with one input side engaging portion. Moreover, it is possible to adopt a structure in which three or more engaging elements are provided and these engaging elements are combined with the corresponding input side engaging portions. These structures are also included within the scope of the present invention.

Second Example

Figure 25:
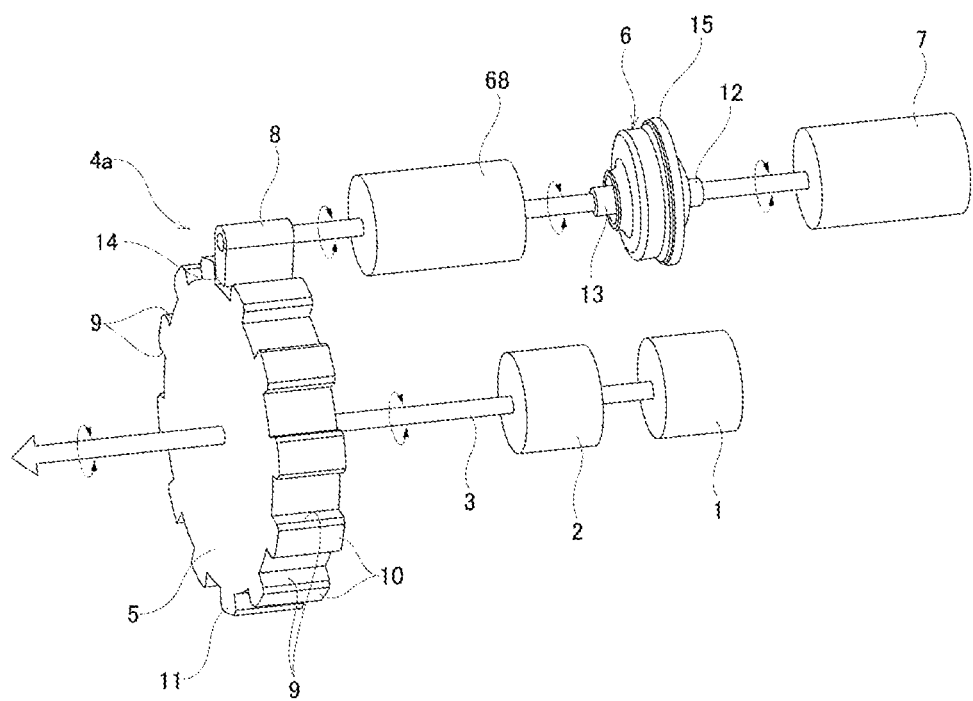
FIG. 25 is a schematic perspective view of a parking locking mechanism in which a rotation locking device according to a second example of an embodiment of the present invention is applied.
Figure 26:
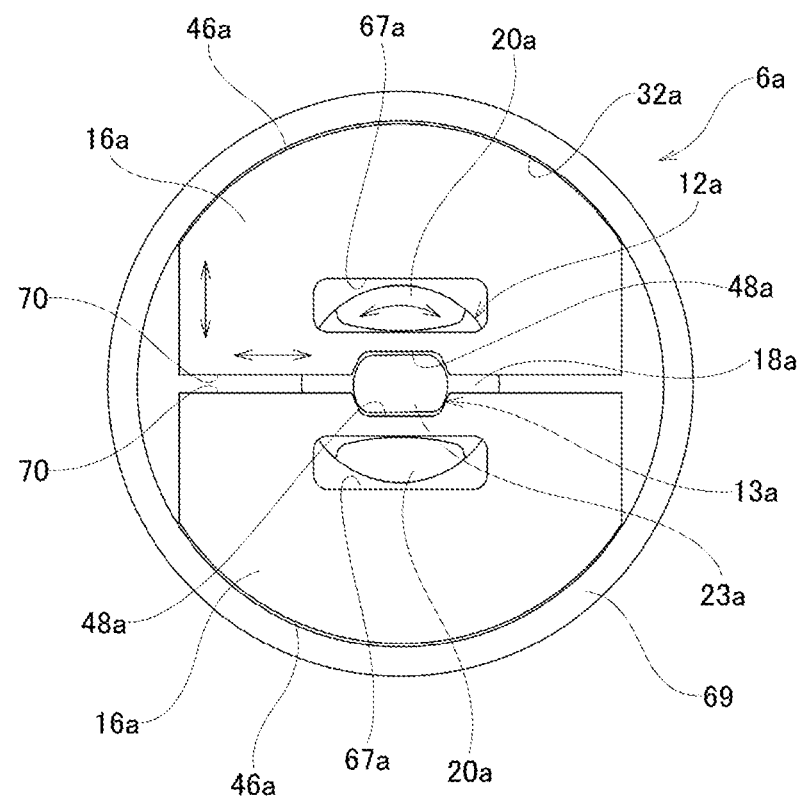
FIG. 26 is an end view of a reverse input blocking clutch of a rotation locking device according to a third example of an embodiment of the present invention.

A second example of an embodiment of the present invention will be described with reference to FIG. 25. The parking locking mechanism to which the rotation locking device 4a of this example is applied includes a speed reducer 68 that increases the output torque of the output member 13 of the reverse input blocking clutch 6 and transmits the output torque to the engaging member 8. Therefore, with this example, it is easier to reduce the size of the actuator 7 as compared with the first example.

Note that the structure of the speed reducer 68 is not particularly limited, and can be configured by a gear type or friction roller type speed reducer. Further, the rotation locking device of the present invention can also be configured such that a speed reducer is arranged between the output shaft of the actuator and the input member of the reverse input blocking clutch. The configuration and operational effects of the other portions of the second example are the same as in the first example.

Third Example

A third example of an embodiment of the present invention will be described with reference to FIGS. 26 to 31. In this example, the structure of the reverse input blocking clutch 6a of the rotation locking device 4 is different from the structure of the reverse input blocking clutch 6 in the first example.

The reverse input blocking clutch 6a includes an input member 12a, an output member 13a, a pressed member 69, and a pair of engaging elements 16a.

Figure 28:
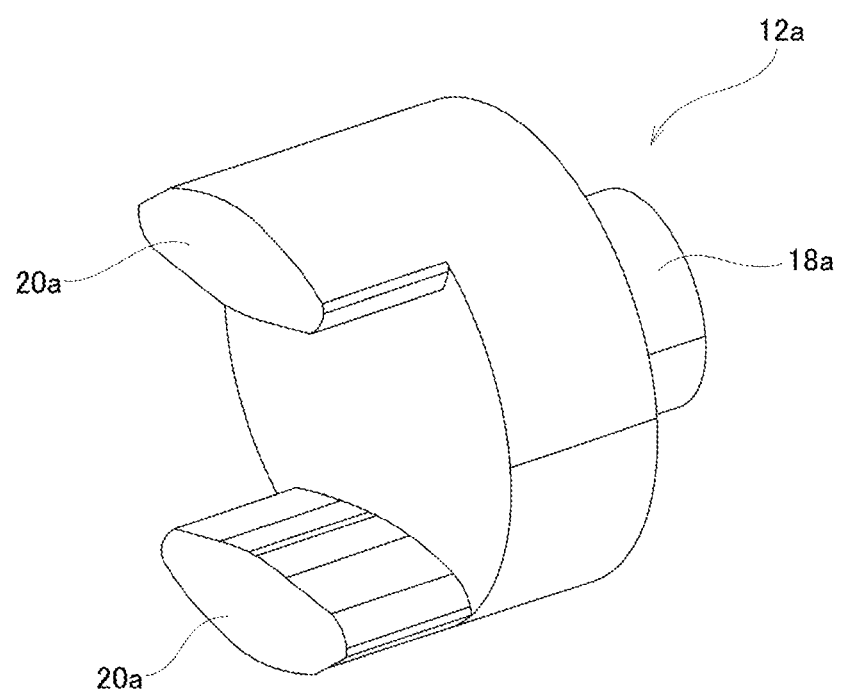
FIG. 28 is a perspective view of a part of the input member of the reverse input blocking clutch of the third example.

The input member 12a is connected to an input side mechanism such as an electric motor or the like, and rotational torque is inputted thereto. As illustrated in FIG. 28, the input member 12a has an input shaft portion 18a and a pair of input member side engaging portions 20a. The base-end portion of the input shaft portion 18a is connected to the output shaft of the actuator 7 (see FIG. 1). The pair of input member side engaging portions 20a are configured by convex portions extending in the axial direction from two positions on opposite sides in the radial direction of the tip-end surface of the input shaft portion 18a.

Figure 29:
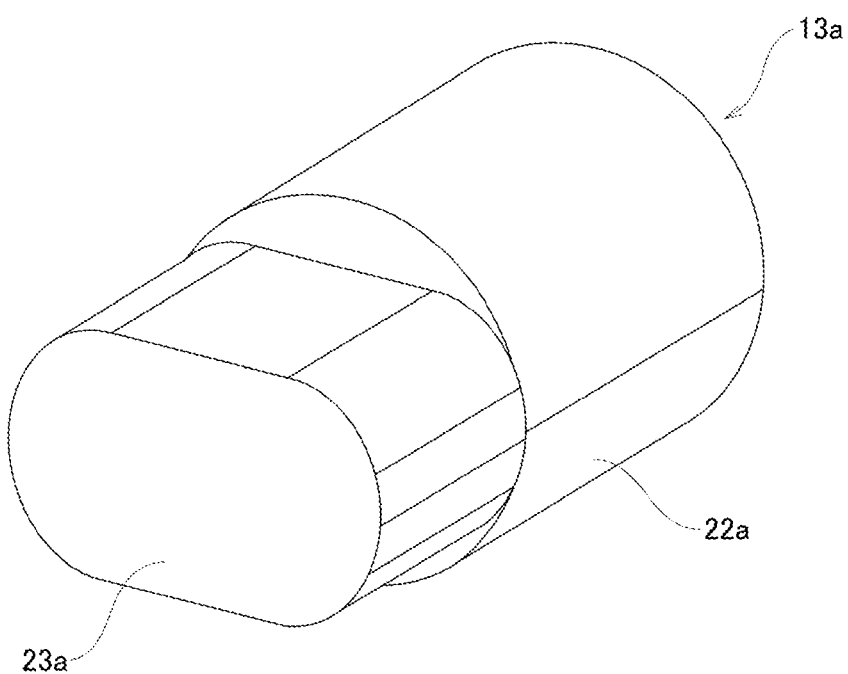
FIG. 29 is a perspective view of a part of the output member of the reverse input blocking clutch of the third example.

The output member 13a is connected to the engaging member 8 (see FIG. 1) and outputs rotational torque. The output member 13a is arranged coaxially with the input member 12a, and has an output shaft portion 22a and an output member side engaging portion 23a as illustrated in FIG. 29. The base-end portion of the output shaft portion 22a is connected to the input portion of the output side mechanism. The output member side engaging portion 23a has a substantially elongated columnar shape and extends in the axial direction from the central portion of the tip-end surface of the output shaft portion 22a. The output member side engaging portion 23a is arranged in a portion between the pair of input member side engaging portions 20a.

Figure 27:
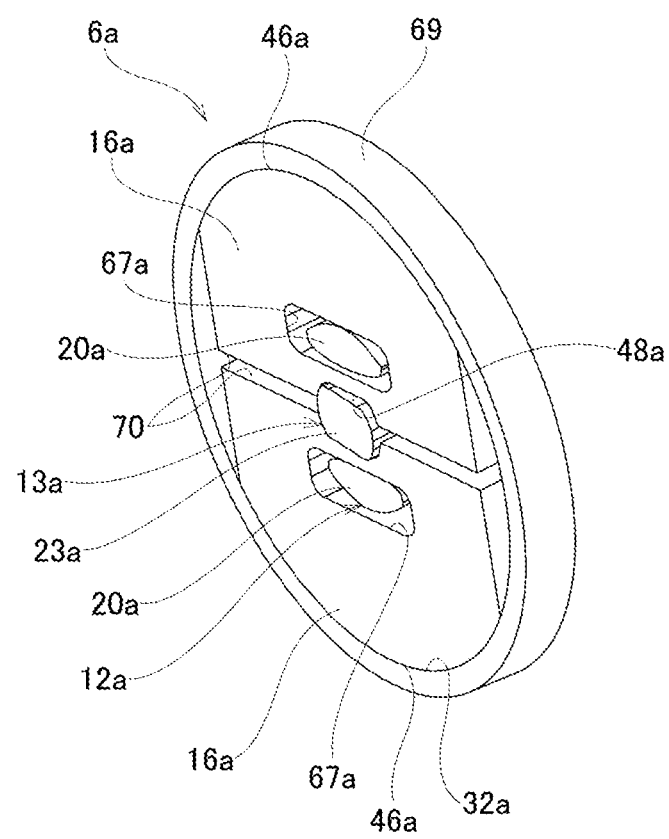
FIG. 27 is a perspective view of the reverse input blocking clutch of the third example.

As illustrated in FIG. 27, the pressed member 69 has an annular shape, is fixed to another member (not illustrated) such as the housing or the like, and the rotation of the pressed member 69 is restricted. The pressed member 69 is arranged coaxially with the input member 12a and the output member 13a, and on the outside in the radial direction the pair of the input member side engaging portions 20a and the output member side engaging portion 23a. The pressed member 69 has a pressed surface 32a which is a cylindrical concave surface on the inner peripheral surface of the pressed member 69.

Each of the engaging elements 16a is formed into a substantially semicircular plate shape, and arranged inside in the radial direction of the pressed member 69. Each of the engaging elements 16a has a pressing surface 46a which is configured of a partially cylindrical convex surface of the outer side surface in the radial direction that faces the pressed surface 32a, and a bottom surface 70 which is configured of a flat surface other than a portion where the engaging element side output engaging portions 48a, which is mentioned later, is provided of the inner side surface in the radial direction that faces that of another engaging element 16a. The radius of curvature of the pressing surface 46a is equal to or less than the radius of curvature of the pressed surface 32a.

In a state in which the pair of engaging elements 16a are arranged inside in the radial direction of the pressed member 69, the inner diameter dimension of the pressed member 69 and the dimension in the radial direction of the engaging element 16a are regulated so that there are gaps in at least one of portions between the pressed surface 32a and the pressing surface 46a and a portion between the bottom surfaces 70 of the pair of engaging elements 16a.

Each engaging element 16a has an engaging element side input engaging portion 67a and an engaging element side output engaging portion 48a. The engaging element side input engaging portion 67a is configured by a hole that penetrates in the axial direction through the intermediate portion in the radial direction of the engaging element 16a. The engaging element side input engaging portion 67a has a size that allows the input member side engaging portion 20a to be loosely inserted. Therefore, the input member side engaging portion 20a is able to displace in the rotation direction of the input member 12a with respect to the engaging element side input engaging portion 67a (engaging element 16a), and the engaging element side input engaging portion 67a (engaging element 16a) is able to displace in the radial direction of the engaging element 16a with respect to the input member side engaging portion 20a. The engaging element side output engaging portion 48a is configured by a substantially rectangular-shaped concave portion that is recessed from the central portion in the width direction of the bottom surface 70 of the engaging element 16a outward in the radial direction. The engaging element side output engaging portion 48a has a size that allows the front half portion in the minor axis direction of the output member side engaging portion 23a to be arranged on the inner side thereof.

In the assembled state of the reverse input blocking clutch 6a, the pair of input member side engaging portions 20a of the input member 12a arranged on one side in the axial direction is inserted in the axial direction in the engaging element side input engaging portions 67a of the pair of engaging elements 16a, and the output member side engaging portion 23a of the output member 13a arranged on the other side in the axial direction is inserted in the axial direction in between the engaging element side output engaging portions 48a of the engaging elements 16a. In other words, the pair of engaging elements 16a is arranged so that the engaging element side output engaging portions 48a sandwich the output member side engaging portion 23a from the outer sides in the radial direction.

Explanation of Operation of the Reverse Input Blocking Clutch 6a

Figure 30:
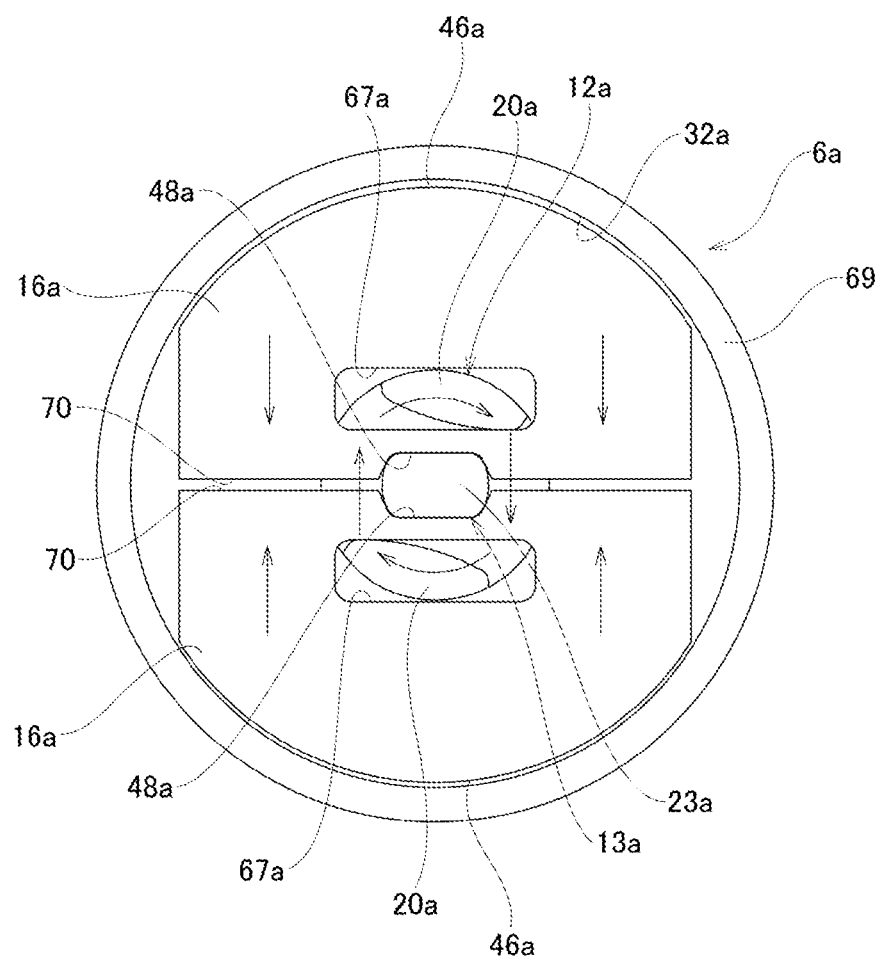
FIG. 30 is a view related to the reverse input blocking clutch of the third example and illustrates a state in which rotational torque is inputted to the input member.

When a rotational torque is inputted to the input member 12a from the actuator 7 (see FIG. 1), as illustrated in FIG. 30, the input member side engaging portions 20a rotate in the rotation direction of the input member 12a (clockwise direction in the example in FIG. 30) inside the engaging element side input engaging portions 67a. Then, the inner side surfaces in the radial direction of the input member side engaging portions 20a press the inner surfaces of the engaging element side input engaging portions 67a inward in the radial direction, which causes the pair of engaging elements 16a to move in directions away from the pressed surface 32a. As a result, the pair of engaging element side output engaging portions 48a hold the output member side engaging portion 23a of the output member 13a from both sides in the radial direction, and the output member side engaging portion 23a and the pair of engaging element side output engaging portions 48a engage without looseness. Accordingly, the rotational torque that is inputted to the input member 12a is transmitted to the output member 13a via the pair of engaging elements 16a and outputted from the output member 13a.

Figure 31:
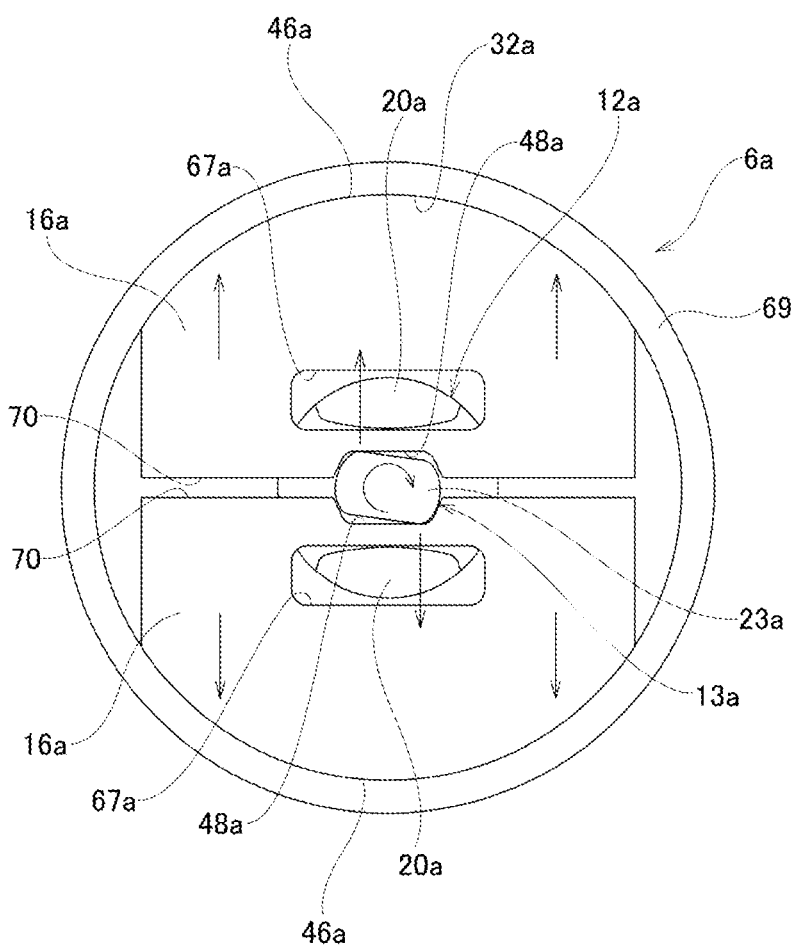
FIG. 31 is a view related to the reverse input blocking clutch of the third example and illustrates a state in which rotational torque is reversely inputted to the output member.
Figure 32:
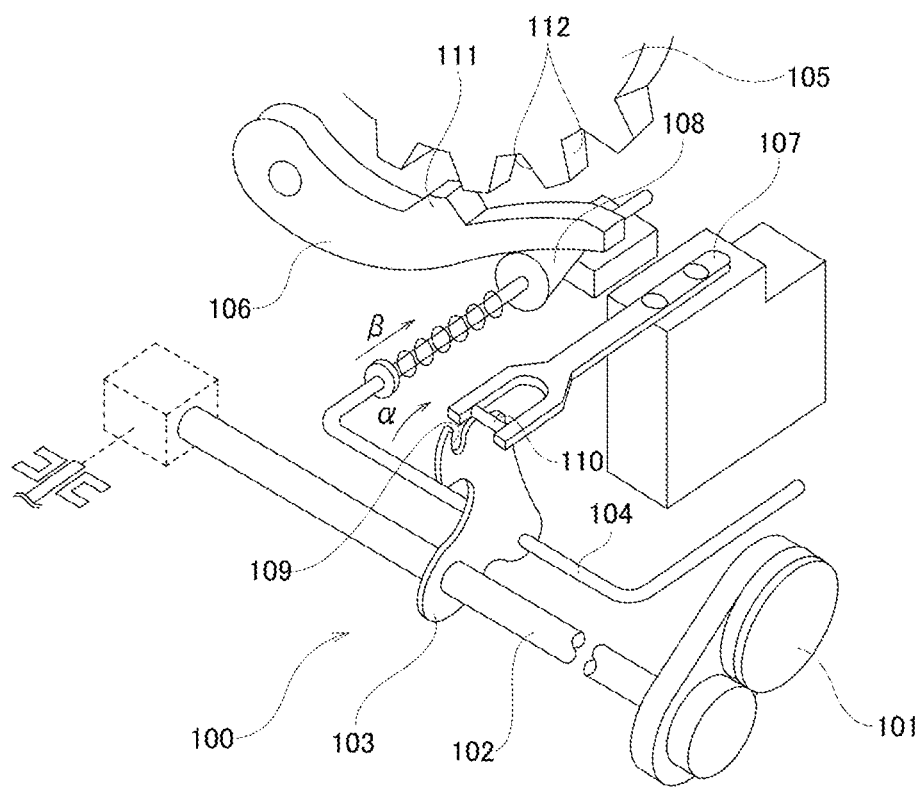
FIG. 32 is a perspective view illustrating an example of conventional structure of a parking locking mechanism.

On the other hand, when rotational torque is reversely inputted to the output member 13a from the locking gear 5 (see FIG. 1) via the engaging member 8, as illustrated in FIG. 31, the output member side engaging portion 23a rotates in the rotation direction (clockwise direction in the example in FIG. 31) of the output member 13a inside the pair of engaging element side output engaging portions 48a. Then, the corner portions of the output member side engaging portion 23a press the bottom surfaces of the engaging element side output engaging portions 48a outward in the radial direction, which causes the pair of engaging elements 16a to move in directions toward the pressed surface 32a. As a result, the pressing surfaces 46a of the pair of engaging elements 16a are pressed against the pressed surface 32a of the pressed member 69. Accordingly, rotational torque that is reversely inputted to the output member 13a is completely blocked by being transmitted to the pressed member 69 that is fixed to another member that is not illustrated and is not transmitted to the input member 12a.

The reverse input blocking clutch 6a of this example can be configured more simply than the reverse input blocking clutch 6 in the first example, and thus cost can be suppressed. The configuration and operational effects of the other portions of the third example are the same as in the first example.

INDUSTRIAL APPLICABILITY

The rotation locking device of the present invention is not limited to a parking locking mechanism and can be applied to various uses such as a stopper for a winch to wind a rope and the like.

REFERENCE SIGNS LIST

1 Drive source
2 Automatic transmission
3 Output shaft
4, 4a Rotation locking device
5 Locking gear
6, 6a Reverse input blocking clutch
7 Actuator 8 Engaging member
9 Engaging concave portion
10 Convex portion
11 Gear portion
12, 12a, 12z Input member
13, 13a Output member
14 Engaging claw portion
15 Housing
16, 16a, 16z Engaging element
17 Spring
18, 18a Input shaft portion
19 Input arm portion
20, 20a, 20a Input member side engaging portion
21 Support hole
22, 22a Output shaft portion
23, 23a Output member side engaging portion
24 Side surface
25 Guide surface
26 Output-side housing element
27 Input side housing element
28 Bolt
29 Outer diameter side cylinder portion
30 Inner diameter side cylinder portion
31 Side plate portion
32, 32a Pressed surface
33 Output side in-row fitting surface
34 Screw hole
35 Output side bearing fitting surface
36 Outer diameter side cylinder portion
37 Inner diameter side cylinder portion
38 Side plate portion
39 Input side in-row fitting surface
40 Through hole
41 Input side bearing fitting surface
42 Input side bearing
43 Output side bearing
44 Engaging element main body
45 Link member
46, 46a Pressing surface
47 Pivot support shaft
48, 48a Engaging element side output engaging portion
49 Internal space
50 Bottom surface
51 Guided surface
52 Insertion hole
53 Convex portion
54 Main body plate
55 Intermediate plate
56 Bolt
57 Nut
58 Convex surface
59 Support hole
60 Plate side output engaging portion
61 Penetrating through hole
62 Through hole
63 Positioning hole
64 Through hole
65 Positioning hole
66 Pivotally supported portion
67, 67a, 67z Engaging element side input engaging portion
68 Speed reducer
69 Pressed member
70 Bottom surface
71 Drive wheel
100 Parking locking mechanism
101 Actuator
102 Shaft
103 Detent plate
104 Rod
105 Parking locking gear
106 Parking locking pole
107 Detent spring
108 Cam
109 Parking locking groove
110 Roller
111 Claw portion
112 Engaging concave portion

The invention claimed is:

1. A rotation locking device, comprising:
a locking gear having engaging concave portions at a plurality of locations in a circumferential direction thereof;
a reverse input blocking clutch having an input member, and an output member arranged coaxially with each other, and in a case where rotational torque is inputted to the input member, transmits the rotational torque inputted to the input member to the output member, and in a case where rotational torque is reversely inputted to the output member, does not transmit the rotational torque inputted to the output member to the input member; and
an engaging member having an engaging claw portion capable of engaging in an engaging concave portion of the engaging concave portions, and is rotatably supported by the output member;
the rotation locking device switching between a first mode where the engaging claw portion engages with the engaging concave portion by the output member rotating the engaging member due to the input member being rotationally driven, and rotation of the locking gear is restricted, and a second mode where engagement between the engaging claw portion and the engaging concave portion is released and rotation of the locking gear is allowed.

2. The rotation locking device according to claim 1, wherein an actuator for rotationally driving the input member is provided.

3. The rotation locking device according to claim 2, wherein
the engagement between the engaging claw portion and the engaging concave portion is released by rotating the engaging member in a same direction as a direction of force applied to the engaging member from the locking gear when switching from the first mode to the second mode.

4. The rotation locking device according to claim 2, wherein the rotation locking device being assembled and used in a drive system for transmitting rotational torque from a drive source to drive wheels.

5. The rotation locking device according to claim 1, wherein
the reverse input blocking clutch comprises:
the input member having an input member side engaging portion;
the output member having an output member side engaging portion;
a pressed member having a pressed surface; and
an engaging element having a pressing surface facing the pressed surface, an engaging element side input engaging portion engaging with the input member side engaging portion, and an engaging element side output engaging portion engaging with the output member side engaging portion; and the engaging element,
when rotational torque is inputted to the input member, displaces so as to separate the pressing surface from the pressed surface due to engagement between the input member side engaging portion and the engaging element side input engaging portion, and by engaging the engaging element side output engaging portion with the output member side engaging portion, transmits the rotational torque inputted to the input member to the output member; and,
when rotational torque is reversely inputted to the output member, displaces so as to press the pressing surface against the pressed surface due to engagement between the output member side engaging portion and the engaging element side output engaging portion, and by frictionally engaging the pressing surface with the pressed surface, does not transmit the rotational torque reversely inputted to the output member to the input member.

6. The rotation locking device according to claim 5, wherein
a pair of engaging elements is provided, each composed of the engaging element; the pair of engaging elements being arranged so as to sandwich the output member side engaging portion from outside in a radial direction thereof.

7. The rotation locking device according to claim 5, wherein
the engaging element, comprises:
an engaging element main body having the pressing surface, the engaging element side output engaging portion, and a pivot support portion located on a side closer to the pressed surface than the engaging element side input engaging portion in a direction of movement of the pressing surface when moving away from or toward the pressed surface; and
a link member having the engaging element side input engaging portion, and a pivotally supported portion that is pivotally supported by and the pivot support portion.

8. The rotation locking device according to claim 7, wherein
the engaging element main body comprises:
a pair of main body plates, each having a plate side output engaging portion constituting the engaging element side output engaging portion, and arranged overlapping in an axial direction of the pressed surface and coupled to each other; and
a pivot support shaft constituting the pivot support portion, both side portions in the axial direction of the pivot support shaft being supported by the pair of main body plates; and
the link member is arranged between the pair of main body plates.

9. The rotation locking device according to claim 8, wherein
the engaging element main body comprises at least one intermediate plate that is sandwiched between the pair of main body plates.

10. The rotation locking device according to claim 1, wherein
a speed reducer is provided between the output member and the engaging member.

* * * * *